United States Patent
Guruprasad

(10) Patent No.: US 11,169,249 B2
(45) Date of Patent: Nov. 9, 2021

(54) CHIRP TRAVELLING WAVE SOLUTIONS AND SPECTRA

(71) Applicant: Venkata Guruprasad, Brewster, NY (US)

(72) Inventor: Venkata Guruprasad, Brewster, NY (US)

(*) Notice: Subject to any disclaimer, the term of this patent is extended or adjusted under 35 U.S.C. 154(b) by 976 days.

(21) Appl. No.: 15/532,974

(22) PCT Filed: Feb. 13, 2015

(86) PCT No.: PCT/US2015/015857
§ 371 (c)(1),
(2) Date: Jun. 2, 2017

(87) PCT Pub. No.: WO2016/099590
PCT Pub. Date: Jun. 23, 2016

(65) Prior Publication Data
US 2018/0267157 A1     Sep. 20, 2018

Related U.S. Application Data

(60) Provisional application No. 62/092,863, filed on Dec. 17, 2014.

(51) Int. Cl.
*G01S 11/02*     (2010.01)
*G01S 11/12*     (2006.01)
(Continued)

(52) U.S. Cl.
CPC ............... *G01S 11/02* (2013.01); *G01S 11/12* (2013.01); *G01S 11/14* (2013.01); *G01S 13/006* (2013.01);
(Continued)

(58) Field of Classification Search
CPC ................................. G01S 11/02; G01S 11/12
See application file for complete search history.

(56) References Cited

U.S. PATENT DOCUMENTS

| 5,963,509 A | 10/1999 | Lindmuller et al. |
| 7,106,801 B1 | 9/2006 | Guruprasad |

(Continued)

FOREIGN PATENT DOCUMENTS

| JP | H10186025 A | 7/1998 |
| JP | 2008542957 A | 11/2008 |

(Continued)

OTHER PUBLICATIONS

Extended European Search Report dated Aug. 6, 2018 in corresponding European Patent Application No. 15870489.0.

(Continued)

*Primary Examiner* — Maurice C Smith
(74) *Attorney, Agent, or Firm* — Ostrager Chong Flaherty & Broitman P.C.

(57) ABSTRACT

Spectral components of waves having one or more properties other than phase and amplitude that vary monotonically with time at a receiver, and provide retardations or lags in the variation in proportion to the times or distances traveled from the sources of the waves to the receiver. The lags concern the property values at departure from a source and are absent in its proximity. Orthogonality of the lags to modulated information makes them useful for ranging and for separation or isolation of signals by their source distances. Lags in frequencies and wavelengths permit multiplication of capacities of physical channels. Constancy of the lagging wavelengths along the entire path from a source to the receiver enables reception through channels or media unusable at the source wavelengths, as well as imaging at wavelengths different from the illumination.

20 Claims, 10 Drawing Sheets

Inventive radio receiver with carrier recovery loop

(51) Int. Cl.
    *G01S 11/14*     (2006.01)
    *G01S 13/34*     (2006.01)
    *G01S 15/00*     (2020.01)
    *G01S 17/00*     (2020.01)
    *G01S 13/00*     (2006.01)

(52) U.S. Cl.
    CPC ............ *G01S 13/34* (2013.01); *G01S 15/006* (2013.01); *G01S 17/006* (2013.01)

(56) References Cited

U.S. PATENT DOCUMENTS

| | | | |
|---|---|---|---|
| 7,180,580 | B2 | 2/2007 | Guruprasad |
| 7,701,386 | B2 | 4/2010 | Guruprasad |
| 8,903,670 | B2 | 12/2014 | Guruprasad |
| 9,134,355 | B2 * | 9/2015 | Basawapatna ....... G01R 23/165 |
| 2006/0002718 | A1 | 1/2006 | Matsui et al. |
| 2008/0032660 | A1 * | 2/2008 | Clark ...................... H04B 1/30 455/323 |
| 2008/0284641 | A1 | 11/2008 | Spreadbury |
| 2009/0181619 | A1 | 7/2009 | Guruprasad |
| 2011/0075768 | A1 * | 3/2011 | Zhan ....................... H03M 1/46 375/340 |
| 2011/0125439 | A1 * | 5/2011 | Guruprasad ............ G01S 3/782 702/79 |
| 2012/0307871 | A1 | 12/2012 | Schaffner |
| 2013/0129026 | A1 | 5/2013 | Peterson |
| 2013/0257643 | A1 | 10/2013 | Inomata et al. |

FOREIGN PATENT DOCUMENTS

| | | |
|---|---|---|
| JP | 2013213761 A | 10/2013 |
| JP | 2013217854 A | 10/2013 |
| JP | 2014062824 A | 4/2014 |

OTHER PUBLICATIONS

Notice of Reasons for Rejection in corresponding Japanese Application No. 2017-532911, dated Nov. 1, 2018.
Ossenkopf, V., "The Stability of spectroscopic instruments: A unified Allan variance computation scheme," Astronomy & Astrophysics manuscript No. 9188, Feb. 2, 2008, 479:915-926.
Almeida, Jose B., "How much in the Universe can be explained by geometry?," Universidade do Minho, Physics Department, arXiv:0801.4089v1 [physics.gen-ph], Jan. 28, 2008, Braga, Portugal.
Riess, Adam G. et al., "A 3% Solution: Determination of the Hubble Constant with the Hubble Space Telescope and Wide Field Camera 3," AstroJ, 730(2); arXiv:1103.2976v1 [astro-ph.CO], Mar. 15, 2011.
Adler, Stephen L., "Modeling the flyby anomalies with dark matter scattering: update with additional data and further predictions.", arXiv:1112.5426v2 [astro-ph.EP] Feb. 17, 2012, Institute for Advanced Study, Princeton, NJ.
Nelson, Erica J. et al., "Spatially Resolved Hx Maps and Sizes of 57 Strongly Star-Forming Galaxies at Z~ 1 From 3D-HST: Evidence for Rapid Inside-Out Assembly of Disk Galaxies.", ApJ Letters; arXiv:1202.1822v1 [astro-ph.CO] Feb. 8, 2012.
Magain, Pierre, "An Expanding Universe Without Dark Matter and Dark Energy", arXiv:1212.1110v2 [astro-ph.CO] Dec. 21, 2012.
Bergemann, M. et al. , " The Gaia-ESO Survery: Radial Metallicity Gradients and Age-Metallicity Relation of Stars in the Milky Way Disk," Astronomy & Astrophysics manuscript No. ms-rw-mb 6, arXiv:1401.4437v1 [astro-ph.GA] Jan. 17, 2014.
Kollmeier, Juna A., et al., "The Photon Underproduction Crisis," arXiv:1404.2933v1 [astro-ph.CO] Apr. 10, 2014.
Einstein, A, "Cosmological Considerations On The General Theory of Relativity", paper included in the Principle of Relativity, Dover, 1952, pp. 177-179.
Hubble, Edwin, "A Relation Between Distance and Radial Velocity Among Extra-Galactic Nebulae", Proc.N.A.S., Jan. 17, 1929, vol. 15, pp. 168-173.
Hubble, Edwin, et al., "Two Methods of Investigating the Nature of the Nebular Red-Shift", 20 Astrophysical Journal, 82:302-337, 1935, The American Astronomical Society USA.
Chandrasekhar, S., et al., "The statistics of the Gravitational Field Arising From a Random Distribution of Stars", Astrophysical Journal, 95:489-531, 1942, The American Astronomical Society USA.
Lambeck, K., "Tidal dissipation in the oceans: astronomical, geophysical and oceanographic consequences,"Philosophical Transactions of the Royal Society A, 287:545-594, Dec. 19, 1977.
Penzias, Arno A., "The Origin of Elements," Nobel Lecture, Dec. 8, 1978, Bell Laboratories, Holmdel NJ USA, pp. 446-457.
Vogler, L.E., "The Attenuation of Electromagnetic Waves by Multiple Knife Edge Diffraction", U.S. Department of Commerce, Oct. 1981, NTIA Report, pp. 81-86.
Harrison, Edward, "Darkness at Night, A Riddle of the Universe," Harvard Univ. Press, Jan. 1989.
Wesson, Paul S. et al.,"The Extragalactic Background Light and a Definitive Resolution of Olbers's Paradox," The Astrophysical Journal, 317: 601-606, Jun. 15, 1987, The American Astronomical Society USA.
Osterchek, Klaus et al., "A Fast, High Resolution Chirp Transform Spectrometer for Atmospheric Remote Sensing From Space," Proceedings of the 11th Annual International Geoscience and Remote Sensing Symposium, Espoo, Finalnd, Jun. 3-6, 1991, vol. 2 (A92-34851 14-43), New York, Institute of Electrical Engineers, Inc., 1991, p. 979-982.
Hartogh, P. et al., "A Fast, High Resolution Chirp Transform Spectrometer for Atmospheric Remote Sensing from Space." In EEE Catalog No. 91CH2971-0 (pp. 979-982), Helsinki: Any Publisher.
Saunders, Simon, "Diffraction Modelling of Mobile Radio Wave Propagation in Built-up Areas," PhD Thesis, Department of Eleclrical Engineering and Electronics, Brunel University, Oct. 1991, pp. 1-234.
Wesson, Paul S., "Olbers's Paradox and the Spectral Intensity of the Extragalactic Background Light," The Astrophysical Journal, 367:399-406, Feb. 1, 1991, The American Astronomical Society USA.
Kaiser, Gerald, "Wavelet Electrodynamics II: Atomic Composition of Electromagnetic Waves," Appeared in Applied and Computational Harmonic Analysis 1:246-260, 1994, arXiv:math-ph/0108014v1, Aug. 20, 2001.
Harutyunian, H.A.,"Some Similarities of Expansion Phenomena in the Vicinity of the Earth and in the Universe as a Whole," Astrophysics, vol. 38, Issue 4, pp. 374-378, Oct. 1995.
Allan, David W. et al., " The Science of Timekeeping," Hewlett-Packard Company Application Note 1289, pp. 64-65, 1997.
Antreasin, P.G., et al., "Investigations into the Unexpected Delta-V Increases During the Earth Gravity Assists of Galileo and Near," American Institute of Aeronautics and Astronautics, 98-4287, 1998.
Bonmassar, Giorgio et al., "Space-Variant Fourier Analysis : Exponential Chirp Transform," IEEE Trans. Patt. An. & Mach Int, 19(10):1080-1089, 1997.
Kagan, Boris A., "Earth-Moon Tidal Evolution: Model Results and Observational Evidence," Progress in Oceanography, vol. 40, Issues 1-4, 1997, Elseveir, pp. 109-124.
Reiss, Adam G. et al., "Observational Evidence from Supernovae for an Accelerating Universe and a Cosmological Constant," AstroJ 116(3):1009-1038, arXiv:astro-ph/9805201v1, May 15, 1998.
Chen, V.C et al., "Time-Varying Spectral Analysis for Radar Imaging of Manoeuvring Targets," IEE Proceedings-Radar, Sonar and Navigation, vol. 145, lssue:5, Oct. 1998, pp. 262-268.
Tong, Raoqiong et al.," Rotation of NMR Images Using the 2D Chirp-z Transform," Magnetic Resonance in Medicine 41:253-256 (1999).
Hau, L.V. et al.,"Light Speed Reduction to 17 Metres Per Second in an Ultracold Atomic Gas," Nature, vol. 397, Feb. 18, 1999, Macmillan Magazines Ltd.
Jenet, F.A.," Detection of Variable Frequency Signals Using a Fast Chirp Transform," Phys. Rev D 62(12), arXiv:gr-qc/0012029v1, Dec. 7, 2000.

(56) References Cited

OTHER PUBLICATIONS

Sandage, Allan et al.," The Tolman Surface Brightness Test for the Reality of the Expansion, I. Calibration of the Necessary Local Parameters," AstroJ, 121:2271-2300, 122: 1071-1103, arXiv:astro-ph/0102213v1, Feb. 12, 2001.

Potts, Daniel et al., "Fast Fourier Tranforms for Nonequispaced Data: A Tutorial," Modern Sampling Theory: Math. and Appl., Birkhauser 2001.

Pollock, Peter, "A Model to Predict Diffraction Attenuation Resulting from Signal Propagation Over the Terrain in Low Earth Orbit Satellite Systems," PhD Thesis, Air Force Institute of Technology, Wright-Patterson Air Force Base, Ohio 2001.

Oberg, James, "How a Swedish engineer saved a once-in-a-lifetime mission to Saturn's mysterious moon," http://spectrum.ieee.org/aerospace/space-flight/titan-calling, Titan Calling—IEEE Spectrum, Oct. 1, 2004.

Brumberg, V.A., "Secular Increase of Astronomical Unit from Analysis of the Major Planet Motions, and it's Interpretation," Institute of the Applied Astronomy, St. Petersburg, Russia, Jul. 18, 2005.

Guruprasad, V, "Prediction of Spectral Shifts Proportional to Source Distances by Time-Varying Frequency or Wave Length Selection," Proceedings of the Nature of Light II: Light in Nature, SPIE Optics & Photonics Symposium, San Diego, Aug. 2008; arXiv:0812.1004v1 [physics.gen-ph] Dec. 4, 2008.

Flanagan, Brian P., "Self Localizing Using A Modulated Acoustic Chirp," MITRE report 06-1164, 2007.

Elmegreen, Debra M. et al., "Resolved Galaxies in the Hubble Ultra Deep Field: Star Formation in Disks at High Redshift," The Astrophysical Journal, 658:763-777, 2007, The American Astronomical Society USA.

Rodriguez, Jose Victor, et al., "A New Solution Expressed in Terms of UTD Coefficients for the Multiple Diffraction of Spherical Waves by a Series of Buildings," Radio Science, vol. 42, RS4011, doi:10.1029/2006RS003464, 2007.

Shin, D.K., "202, Rev. B 34-m and 70-m Doppler," DSN Telecommunications Link Design Handbook, 810-005, California Institute of Technology, Sep. 30, 2010.

Jensen, B.E., "New High Performance Integrated Receiver/Ranging/Demodulator System for Estrack," SpaceOps98, Paper ID 5a008, 1998.

Burton, M.E., "The Cassini/Huygens Venus and Earth Flybys: An Overview of Operations and Results," Journal of Geophysical Research, vol. 106, No. A12, pp. 30,099-30,107, Dec. 1, 2001, The American Geophysical Union.

Anderson, J.D., "Anomalous Orbital-Energy Changes Observed During Spacecraft Flybys of Earth," Physical Review Letters, 100:091102, Mar. 7, 2008, The American Physical Society.

Guruprasad, V., "A Wave Effect Enabling Universal Frequency Scaling, Monostatic Passive Radar, Incoherent Aperture Synthesis, and General Immunity to Jamming and Interference," IEEE MILCOM 2005, arXiv0812.2652v1 [physics.gen.ph] Dec. 14, 2008.

Anderson, J.D., "The Energy Transfer Process in Planetary Flybys," NewAstron, 12:383-387 2006, arXiv:astro-ph/0608087v2 Nov. 2, 2006.

Keiner, Jens et al.,"Using NFTT 3—A Software Library for Various Nonequispaced fast Fourier Transforms," ACM Transactions on Mathematical Software, vol. V, No. N, M 2008, pp. 1-23.

Williams, James G., "Lunar Core and Mantle. What Does LLR See?", Proceedings of the 16th International Workshop on Laser Ranging, Poland 2009.

Wu, X., et al., "Accuracy of the International Terrestrial Reference Frame Origin and Earth Expansion," Geographical Research Letters, vol. 38, LI 3304, 2011, American Geophysical Union.

Gierl, C., et al., "Surface Micromachined Tunable 1.55um-VCSEL with 102 mn Continuous Single-Mode Tuning," Optics Express, Aug. 29, 2011, vol. 19, No. 18, pp. 17336-17343.

Olive, K A et al., "Review of Particle Physics: Big-Bang Cosmology," Phys Rev D, 86 Article 010001(1), 2012.

Anderson, J.D., "Study of the Anomalous Acceleration of Pioneer 10 and 11," Phys Rev D, 65:082004/1-50, arXiv: gr-qc/0104064v5 Mar. 10, 2005.

Guruprasad, V., "Relativity of Spatial Scale and of the Hubble Flow: The Logical Foundations of Relativity and Cosmology," arXiv:gr-qc/0005014v1, May 4, 2000.

Dumin, Yurii V., "Can (dG/dt)/G Bound the Local Cosmological Dynamics," arXiv:gr-qc/0610035v1, Oct. 19, 2006.

Williams, James G et al., "Reply to the Comment by Dumin on 'Progress in Lunar Laser Ranging Tests of the Relativistic Gravity'", Phys. Rev. Letter, 98:059002, arXiv:gr-qc/0612171v1, Dec. 27, 2006.

Cooperstock, F.I., "The Influence of the Cosmological Expansion on the Local Systems", The Astrophysical Journal, 503:61-68, The American Astronomical Society, USA, arXiv:astro-ph/9803097v1, Mar. 9, 1998.

Born, M. et al., "Principles of Optics: Electromagnetic Theory of Propagation, Interference and Diffraction of Light," 7th Edition, Cambridge, 2002, pp. 16-18 and 375-378.

Eddington, A., "The Expanding Universe," Cambridge, 1933, pp. 87-89.

Eddington,A., "The Expanding Universe," Cambridge, 1933, pp. 90-92.

International Preliminary Report on Patentability for Int'l Appl. No. PCT/US2015/015857, dated Jun. 29, 2017.

\* cited by examiner

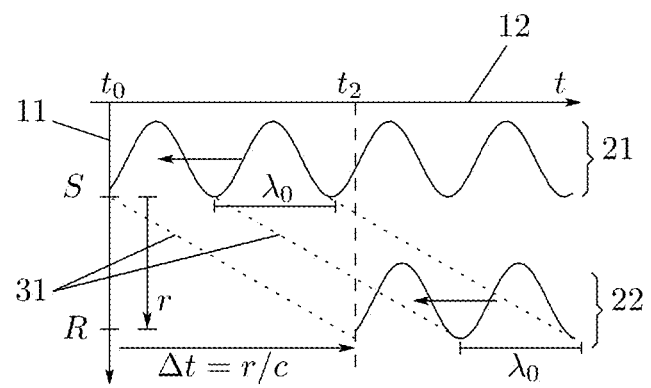
(a) In sinusoidal waves
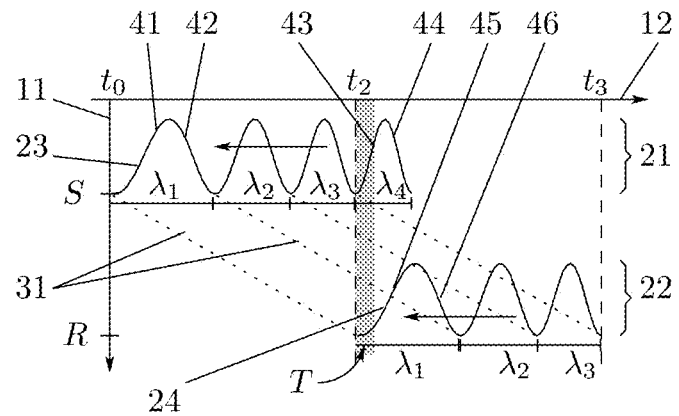
(b) In chirp waves
Figure 1: d'Alembertian principle

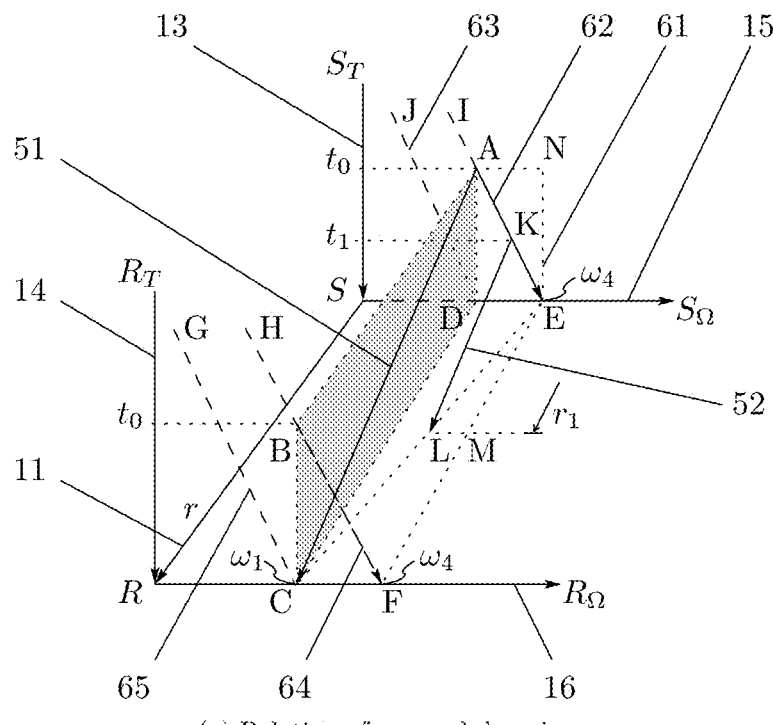
(a) Relation of spectral domains
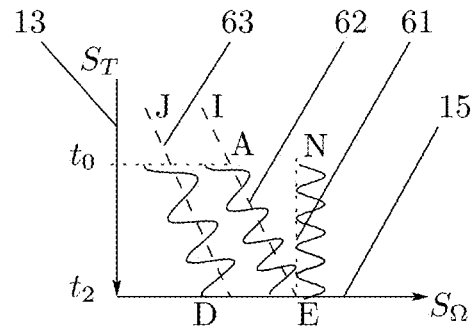
(b) Time-frequency
Figure 2: Time and frequency
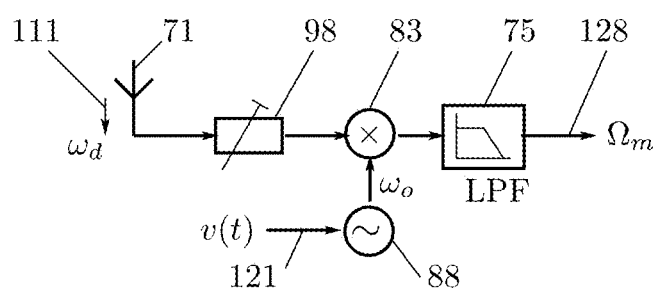
Figure 3: Inventive direct conversion radio receiver

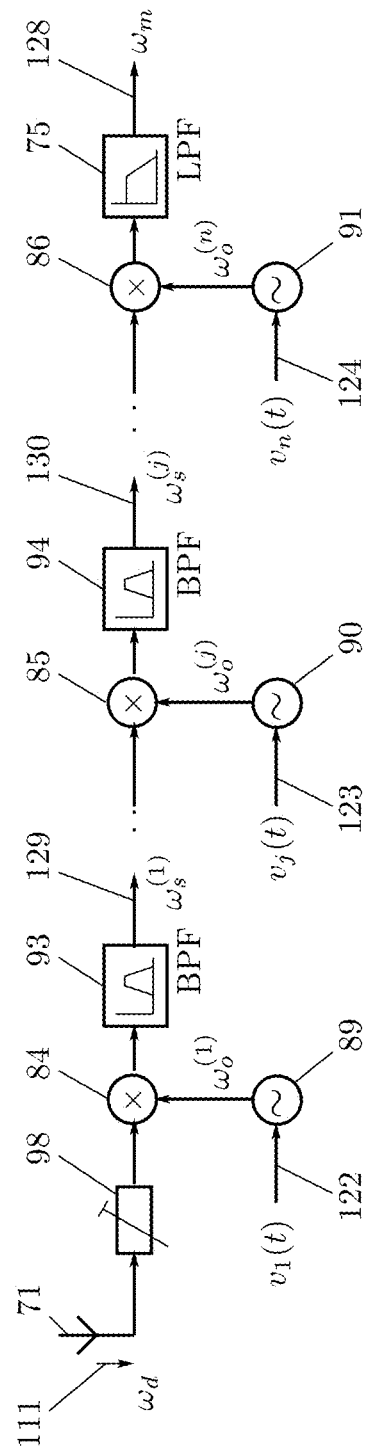
Figure 4: Inventive superheterodyne radio receiver

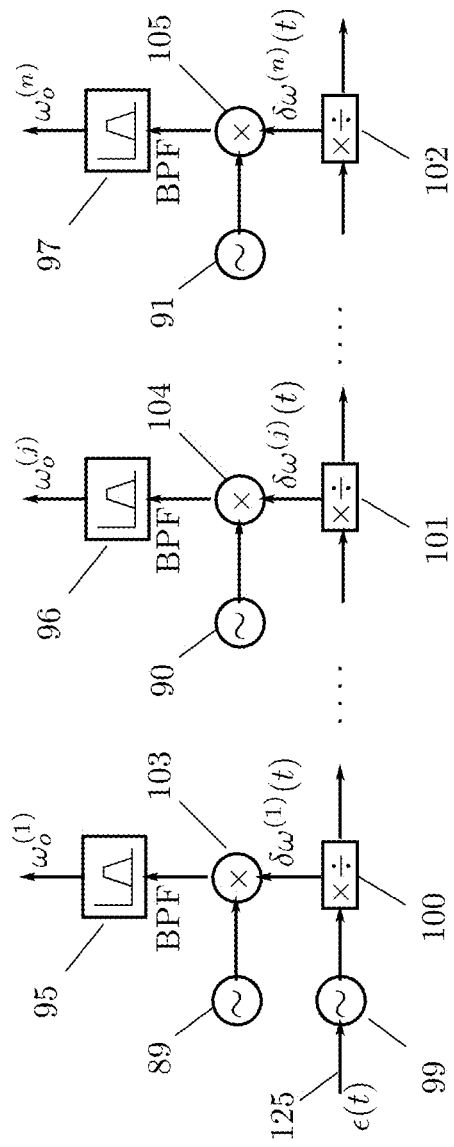
Figure 5: Controlled variation of reference frequencies by heterdyning

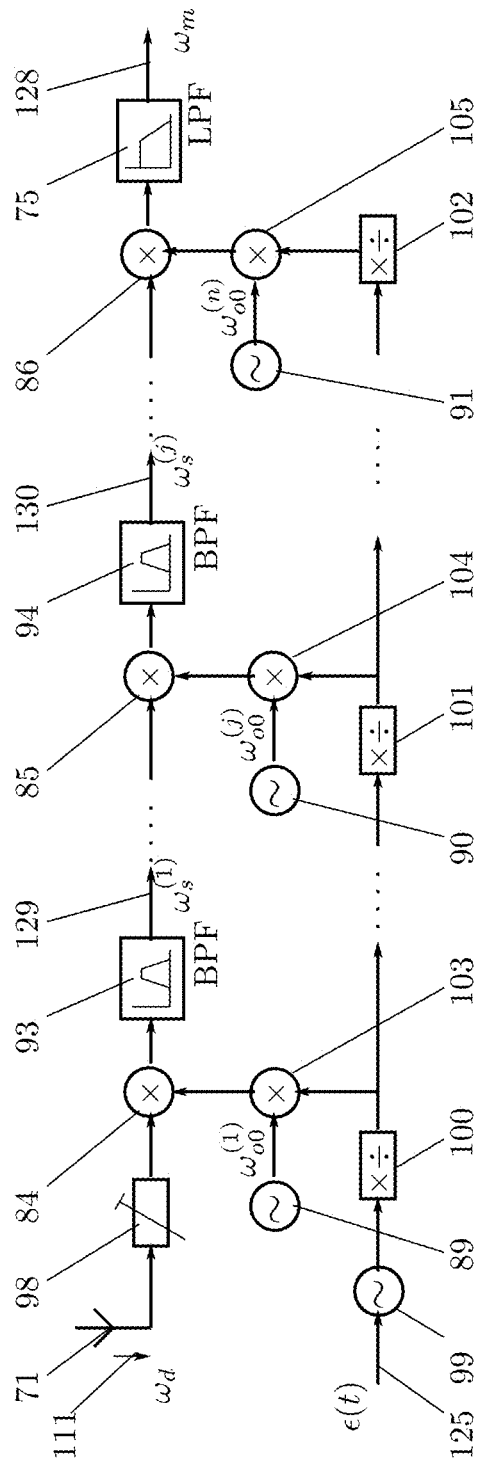
Figure 6: Inventive receiver with heterodyned reference variation

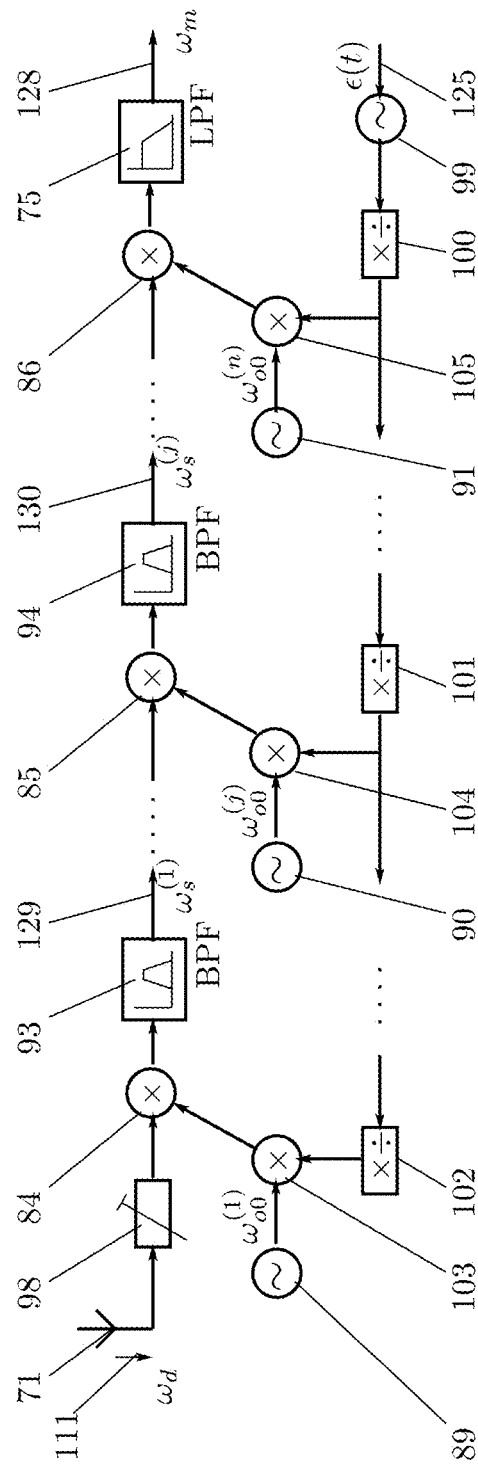
Figure 7: Inventive receiver with alternative heterodyned reference variation

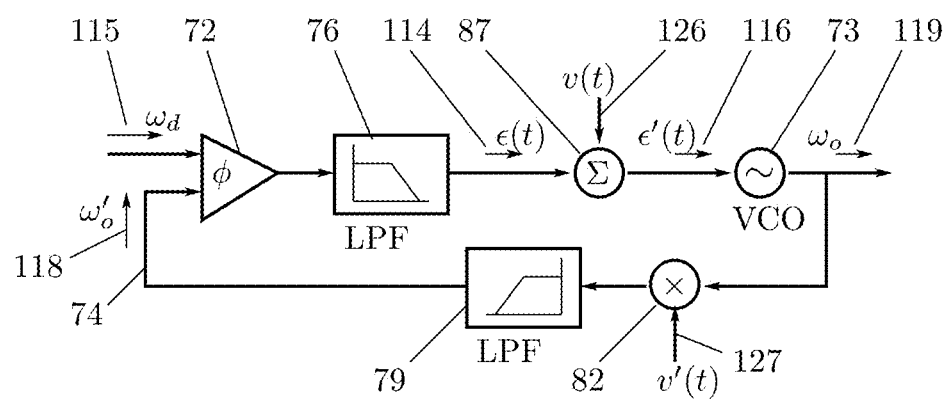
Figure 8: Inventive radio receiver with carrier recovery loop

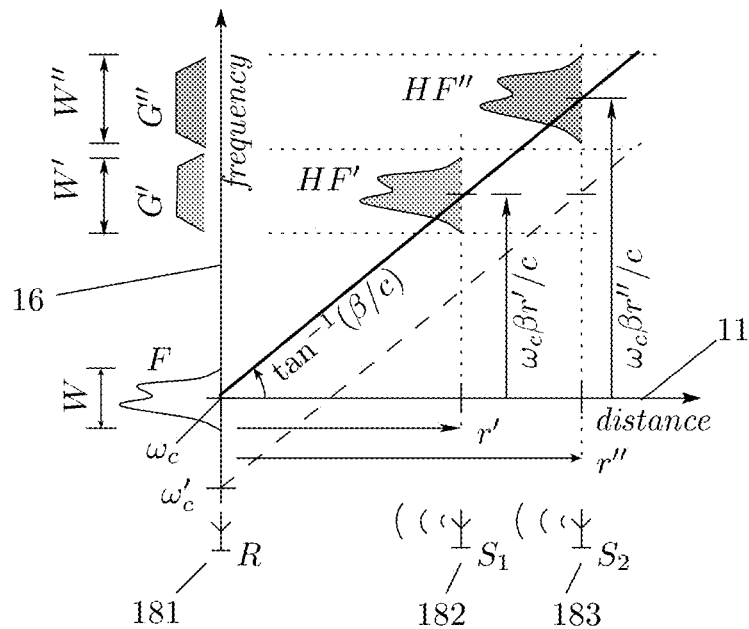
(a) Frequency domain parallax
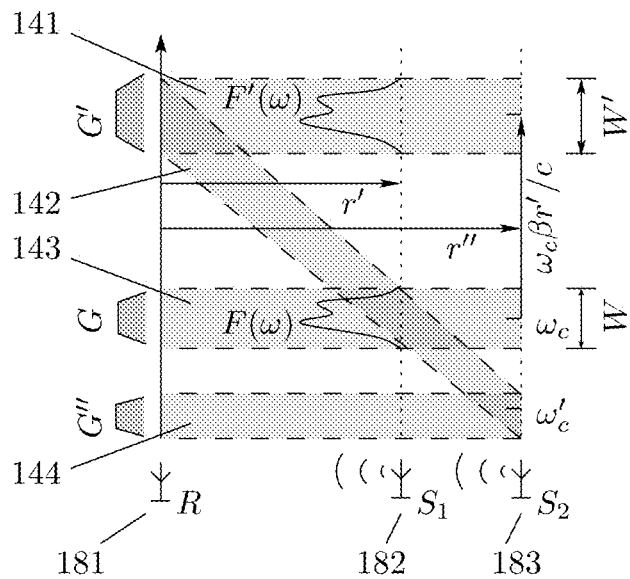
(b) Time-frequency
Figure 9: Distance-division multiplexing

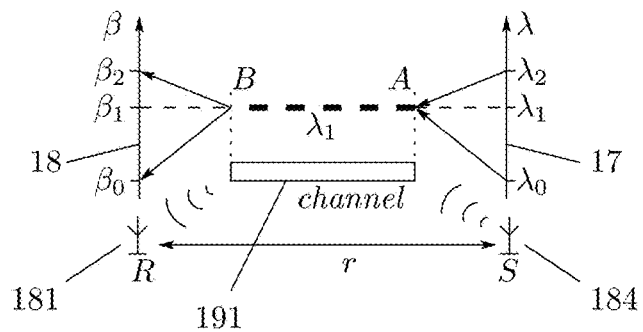
(a) Capacity multiplication
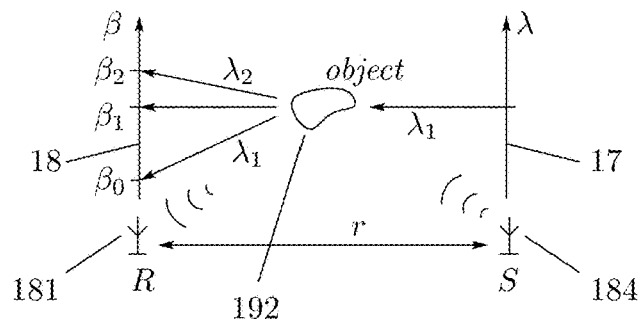
(b) $\lambda$ varied imaging
Figure 10: Rate-division multiplexing
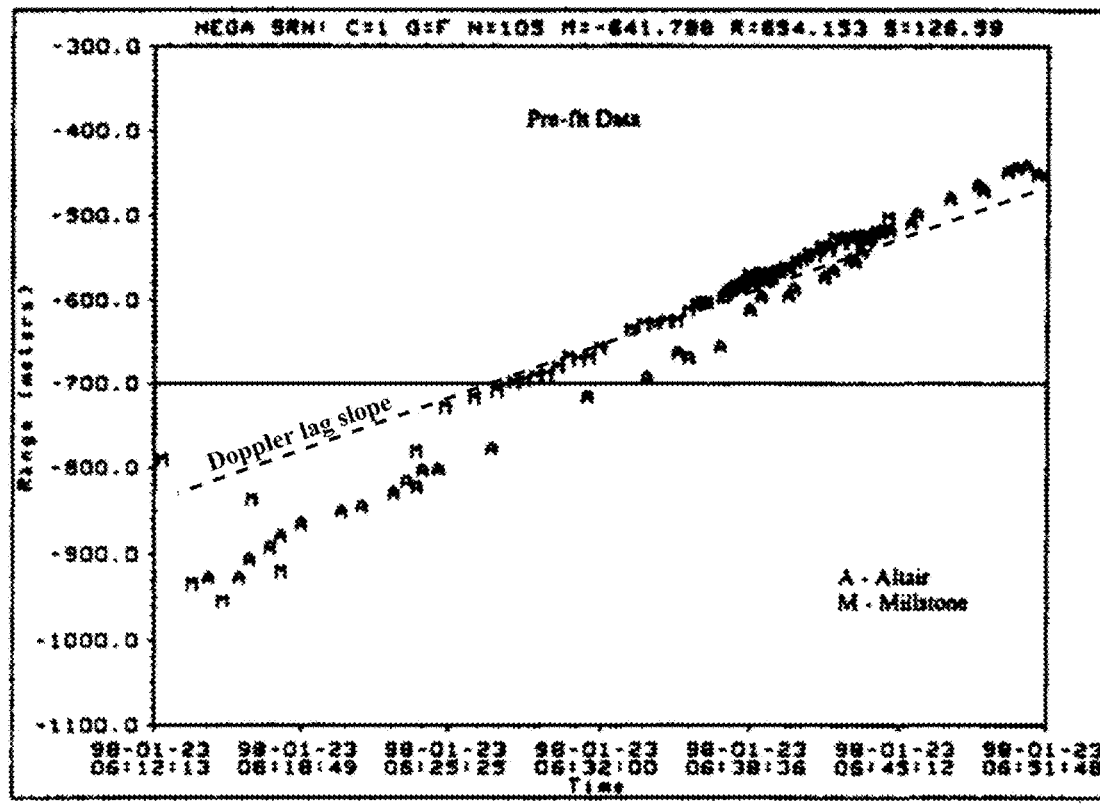
Figure 11: SSN range residuals for NEAR flyby - from Antreasian and Guinn (1998)

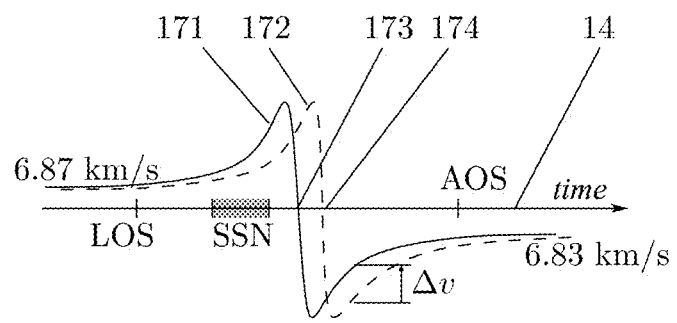
(a) DSN Doppler vs. true velocity
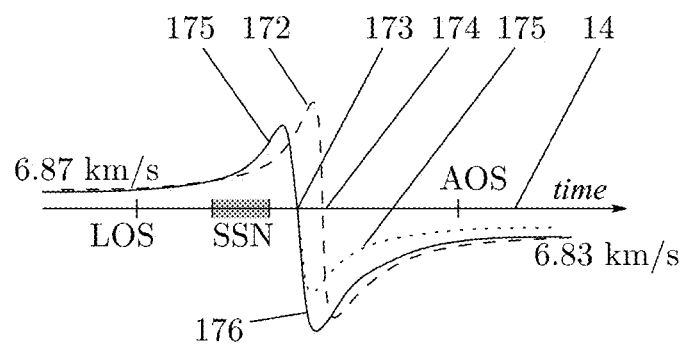
(b) DSN Doppler vs. estimation
Figure 12: Frequency lags in flyby Doppler signal

CHIRP TRAVELLING WAVE SOLUTIONS AND SPECTRA

BACKGROUND OF THE INVENTION a. Technical Field

This invention concerns determination of the distances to one or more sources of electromagnetic, acoustic or other waves, and the selection or discrimination of such waves from one or more desired sources from the totality of all waves of similar physical nature arriving at a receiver.

More specifically, this invention concerns manifestation of physical information of the travelled time or distance from a wave source through spectral decomposition or selection at a receiver.

b. Brief Description of the Prior Art

U.S. Pat. No. 7,180,580, titled "Passive distance measurement using spectral phase gradients" (filed 2 Jul. 2004, issued 2 Dec. 2014), U.S. Pat. No. 8,903,670, titled "Distance-dependent spectra with uniform sampling spectrometry" (filed 14 Feb. 2006), and international patents issuing thereon, hereinafter referred to as the Phase Gradient Patents, describe obtaining spectral shifts in waves received from one or more sources, in proportion to the respective source distances directly from the waves, i.e., without knowledge of the source distances or locations, and without using information modulated or encoded in the waves. Achieving such shifts by receiver action had been previously inconceivable.

The Phase Gradient Patents describe applying a rate of change $d\hat{\omega}/dt$ in the reference angular frequencies $\hat{\omega}$ or reference wavevectors $\hat{k}=\hat{\omega}/c$ within a spectral decomposition or selection process, as $d\hat{k}/dt \equiv c^{-1} d\hat{\omega}/dt$, where c is the wave speed and t is time measured at the receiver, thereby forcing a similar variation of the frequency selected from the arriving waves. In the phase expression $\phi = -\omega \times (t-r/c) \equiv kr - \omega t$ for a propagating wave, r denotes the distance from its source, $\omega$ is its angular frequency, and the space part $kr \equiv \omega r/c$ is the phase lag relative to the source. As the selected frequencies change, the phase lags must correspondingly vary, but any changing phase is a frequency, so the changing phase lags produce a frequency shift $\Delta \omega = \dot{\omega} \partial(kr)/\partial \hat{\omega} = \dot{\omega} r/c = \beta \omega r/c$, where $\beta \equiv \dot{\omega}/\omega \equiv \hat{k}^{-1} d\hat{k}/dt$ denotes the fractional, or normalized, rate of the change. Phase lags are not ordinarily usable for ranging as phase is cyclic, but the frequency shifts would be acyclic. This transformation of an unusable cyclic variable into a useful acyclic quantity was a key innovation.

The spectral phase gradient is the factor $\partial \phi/\partial k \equiv \partial(kr-\omega t)/\partial k = r$ that provides the physical information of distance in the obtained shifts. U.S. Pat. No. 7,180,580 improves over a frequency comb method for pulse radar that uses phase lag differences $-\Delta \phi \equiv k \Delta r + r \Delta k$ in echoes obtained at interrogating wave number increments $\Delta k = \Delta \omega/c$ to image target features in the radial direction. As the cyclic repetition of phase lag differences causes aliases at intervals of $c/\Delta k$, the full range $r = \lim_{\Delta k \to 0} \Delta \phi/\Delta k$ appeared to require infinitely precise measurements of phases at infinitely low frequencies k, $\omega \to 0$. These problems were overcome in the invention using the limit ratio of rates $r = \lim_{\Delta t \to 0}(\Delta \phi/\Delta t)/(\Delta k/\Delta t) = c \delta \omega/\hat{\omega}$, as this involves only frequencies.

The variation of selected frequencies is equivalent to varying the wavelength scale of the receiver, but the shifts disclosed in the above patents are unrelated to a cumulative change of receiver scale. Cumulative change of scale due to a hypothetical shrinkage of atoms everywhere would be equivalent to the cosmological shifts and time dilations, as pointed by A Eddington in *The expanding universe*, Cambridge, 1933 (pages 90-92), as all observed light would be shifted and dilated in proportion to its age, but this similarity is superficial. Eddington's model concerns only static changes of scale, in which the shifts and dilations do not vanish if the shrinkage stops, but the Phase Gradient Patents concern a rate of change $\beta$ at an individual receiver, such that the shifts vanish entirely if the rate vanishes. Eddington's model is equivalent to Hubble's law, $z = H_0 r/c$, where $H_0$ and the resulting shift factors z do not depend on the receiver. In contrast, the fractional rate $\beta$, yielding shift factors $z = \beta r/c$, would be set by the receiver, and large enough to produce usable shifts even on earth.

U.S. Pat. No. 7,701,386, titled "Universal frequency generation and scaling" (filed 10 Oct. 2006, issued 20 Apr. 2010), hereinafter referred to as the Frequency Generation Patent, describes generating waves of arbitrary wavelengths using the principle of the Phase Gradient Patents to transform waves from existing sources to the desired wavelengths, without specific media or material properties.

U.S. Pat. No. 7,106,801, titled "Distance division multiplexing" (filed 1 Mar. 2005, issued 12 Sep. 2006), hereinafter referred to as the Multiplexing Patent, describes use of the principle of the Phase Gradient Patents to separate or isolate band limited signals transmitted by one or more of the wave sources from the received waves, without involving or depending on modulated or encoded content. Since all of the signals would be transmitted over the same frequencies, and yet separately received, the capacity of the physical medium or channel would be effectively multiplied. As the signal of any specific source thus becomes always separable from signals emitted by all other sources at the same frequencies, the invention assures an absolute receiver-side defence against jamming ("A wave effect enabling universal frequency scaling, monostatic passive radar, incoherent aperture synthesis, and general immunity to jamming and interference", IEEE MILCOM 2005).

Additional theoretical insights and calculations for cellular communication and optical fibres are included in the paper "Prediction of spectral shifts proportional to source distances by time-varying frequency or wavelength selection", in the *Proceedings of the Nature of Light II: Light in Nature, SPIE Optics+Photonics Symposium*, San Diego, August 2008 (paper 7057-11, archived as arXiv: 0812.1004v1 at www.arXiv.org), hereinafter referred to as the SPIE paper.

There is yet some scope for refinement and improvement in the above ideas, as follows.

a. Causality and information. Since wave travel literally means that phases of individual components travel without change, the phase differences between components, and therefore also the gradient of phase across them, travel unchanged, and cannot possibly provide a cumulative effect revealing travel distance. The spectral phase gradients of an impulse are proportional only to its instantaneous distance from the receiver: they correspond to the source distance only while the impulse is at the source, and vanish as the impulse arrives at the receiver. Using spectral phase gradients to obtain the source distance information thus seems to violate causality.

The constancy of phase differences is especially critical in communication technology, so the use of the spectral phase gradients in a manner suggesting cumulative change would also question the utility of the approach. However, distance information cannot come without accumulation in some form, as it also cannot result purely from spectral analysis unless already present in arriving waves. Also, the Parseval-Plancherel theorems establish that the energy of a signal is fully represented by its Fourier spectrum, which does not reveal the source distances.

However, any process of spectral selection necessarily involves integration and would be affected by the time variation during integration, so the spectra obtained cannot have constant frequencies and the usual notions of information and phases raising such issues cannot be correct. There is thus need for correct notions applicable to the spectra obtained in the Phase Gradient Patents.

b. Time dilations. All proportional shifts imply time dilations, via the inverse Fourier transform $$\int_\Omega F(\omega[1+z])e^{i\omega t}d\omega \equiv \int_\Omega F(\omega')e^{i\omega' t/[1+z]}\frac{d\omega'}{1+z} = \frac{1}{1+z}f\left(\frac{t}{1+z}\right), \quad (1)$$

for a uniform scaling of components $F(\omega) e^{i\omega t} \to F(\omega[1+z])$ $e^{i\omega t}$ by a fractional shift $z \equiv \Delta\omega/\omega$. A proportional shift of frequencies is thus always equivalent to a scaling of time by $(1+z)^{-1}$. The amplitude factor in the result is due to stretching of the wave energy over the dilated time scale, or compressed scale when $z<0$, of the arriving waveforms. This stretching is especially illustrated by the Type 1a supernova light (intensity) curves, which are time dilated to weeks and even months at extreme redshifts. The cosmological time dilations particularly distinguish relativistic expansion from interactions with matter, as matter interactions cannot be uniform across wavelengths. This distinction is the essence of Tolman's test designed to differentiate relativistic expansion from "tired light" mechanisms, in which the intervals between photons were not expected to change with energy loss ["Two Methods of Investigating the Nature of the Nebular Red-Shift", E Hubble and R Tolman, *ApJ*, 82:302-337, 1935]. The proportional dilation of photon intervals has been now confirmed for the cosmological shifts ["The Tolman Surface Brightness Test for the Reality of the Expansion", A Sandage and L M Lubin, *Astro J*, 121:2271-300, 122:1071-1103, 2001]. Similar time dilations with Doppler shifts impacted the Cassini mission [J Oberg, "Titan calling", IEEE Spectrum, October 2004].

Eq. (1) says that the time dilations must also accompany the frequency shifts described in the Phase Gradient Patents but a colocated conventional receiver must see no shifts or dilations. The same peaks and troughs are thus needed at every possible dilations, to satisfy selection by receivers using arbitrary fractional rates $\beta$ at arbitrary ranges. This seems to contradict the conservation of energy in radiative processes, but a single selection process returns components of only one fractional rate $\beta$, so the concurrent availability of other dilations is not any different from concurrent reception by multiple receivers. The argument reveals a need for a broader physical picture of spectra.

B-1 Chirp Transforms and Waveforms in Prior Art

The radar wavelength comb method cited above establishes sufficiency of phase lag differences for imaging at wavelengths comparable to the spatial features of interest. Holography and synthetic aperture imaging prove their sufficiency also for coherent imaging down to optical wavelengths. The limitation to incremental range features in these cases is due to the cyclicity of phase, so a deeper reason in nature is obviated. The unavailability of distance proportional frequency shifts in spectra follows from the assumption of constant frequencies in Fourier analysis, which thus precludes any reliable inference of a deeper law. The unavailability would be fundamental only if a decomposition of waves into components of nonconstant frequencies were proved impossible in itself, or if such components proved incapable of distance proportional frequency shifts.

The simplest functions having nonconstant frequency are chirps whose frequencies vary linearly or exponentially with time. Chirp transforms are used in imaging [G Bonmassar and E L Schwarz, "Space-Variant Fourier Analysis: The Exponential Chirp Transform", *IEEE Trans Patt An & Mach Int*, 19(10):1080-1089, 1997; R Tong and R W Cox, "Rotation of NMR Images Using the 2D Chirp-z Transform", *Mag Res Med*, 41:253-256, 1999], but with no scope for the distance proportional frequency shifts because the transform is applied to image data, and not to waves.

Current uses of chirp waveforms in CW-FM (continuous wave, frequency modulated) radars and sonars [cf. B P Flanagan, "Self Localization using a Modulated Acoustic Chirp", MITRE report 06-1164, 2007] rely on sinusoidal properties—shifts revealing the two-way range are obtained only in Fourier echo spectra relative to the transmitter frequency. Use of chirped carriers in communication [US Patent publication 2012/0307871, "RF chirp receiver synchronization", T M Schaffner, 2012; US Patent publication 2013/0129026, "Chirp receiver utilizing phase precessed chirp signals", J L Petersen, 2013] utilize the same principle, as do studies of bats [N Ulanovsky and C F Moss, "What the bat's voice tells the bat's brain", *PNAS*, 105(25):8491-8498, 2008]. Constant frequencies are assumed even in current wavelet formalisms [e.g., G Kaiser, "Wavelet Electrodynamics II: Atomic Composition of Electromagnetic Waves", *Appl & Comp Harmonic Analysis*, 1:246-260, arXiv:math-ph/0108014v1, 1994, and "Short-pulse radar via electromagnetic wavelets", *Ultra-Wideband, Short-Pulse Electromagnetics* 3, Plenum, 1997], making them equivalent to sinusoids in this context.

Chirp transforms are also being applied to variable frequency signals on earth and in low orbits [F A Jenet and T A Prince, "Detection of variable frequency signals using a fast chirp transform", *Phys Rev D*, 62(12), 2000; K Osterschek and P Hartogh, "A fast, high resolution chirp transform spectrometer for atmospheric remote sensing from space", *Proc 11th Inti Geosci & Rem Sens Symp*, Finland, 1991; V C Chen and W J Miceli, "Time-varying spectral analysis for the radar imaging of manoeuvring targets", *IEE Proc Radar, Sonar & Navigation*, 145(5):262-268, 1998; N Dastgir, "Processing SAR data using Range Doppler and Chirp Scaling Algorithms", MS Thesis, Geodesy Report 3096, Royal Inst of Tech, Sweden (2007)]. In all such cases, the frequency variation is either a modulation or due to fluctuations in the transmission medium, unrelated to wave travel.

B-2 Specific Evidence for the Phase Gradient Shifts

Remarkably, evidence of distance proportional shifts with the same relation $\Delta\omega=\beta\omega r/c$, related to the Doppler shifts in both magnitude and origin, and unrelated to the cosmological shifts, exists in the large discrepancies reported between the Space Surveillance Network (SSN) radars and NASA's Deep Space Network (DSN) tracking data in the 1998 flyby of the NEAR spacecraft.

The SSN radars use coherent processing with resolutions of 20 m at Altair and 5 m at Millstone, but the discrepancies were 450 m to almost 1 km, with "an intriguing slope that could not be reduced through estimation" (of $\Delta\upsilon$) [P G Antreasian and J R Guinn, "Investigations into the unexpected Delta-V increases during the earth gravity assists of Galileo and NEAR", *AIAA*, 98-4287, 1998]. The discrepancies have not been mentioned in any subsequent papers on the "flyby anomaly", which refers only to the smaller discrepancy of 760 mHz between the pre-encounter and the post-encounter DSN Doppler data, also appearing as a velocity gain $\Delta\upsilon\approx13$ mm s$^{-1}$ in DSN range data. Post-encounter DSN Doppler oscillations of 50 mHz amplitude also reported by Antreasian and Guinn have been attributed to direction prediction errors within the trajectory software. However, further predictions of a phenomenological model [J D Anderson, J K Campbell et al, "Anomalous Orbital-Energy Changes Observed during Spacecraft Flybys of Earth", *PRL,* 100(9):091102, 2008] were not supported by ESA's tracking data in the 2007 and 2011 Rosetta flybys, and the only flyby anomaly in an ESA mission, 1.82 mm s$^{-1}$ in Rosetta's 2005 flyby, also appears primarily of DSN origin [J D Anderson, J K Campbell and M M Nieto, "The Energy Transfer Process in Planetary Flybys" arXiv.org: astro-ph/0608087v2, *NewAstron,* 12(383-397), 2006, § 3.4]

A Doppler signal of itself is free of clock jitter and atmospheric effects that affect radar ranging, as well as of modulated range codes ambiguities [§ III-B of J D Anderson, P A Laing et al, "Study of the anomalous acceleration of Pioneer 10 and 11", *Phys Rev D,* 65:082004/1-50, 2002, also: arXiv:gr-qc/0104064]. An SSN clock error solely during the 38 min of the flyby is implausible. Atmospheric effects could not be significant: the range during SSN tracking decreased from 29,000 km, close to that of geostationary satellites, to 13,150 km, far beyond the atmosphere. The DSN Doppler involves computation that could have systematic errors, however, and the DSN range data uses the Doppler for disambiguation, unlike two-way range by a coherent radar.

ESA tracking derives both the Doppler and the reference carrier for telemetry demodulation by Fourier transform [B E Jensen, "New high performance integrated receiver/ranging/demodulator system for ESTRACK", *SpaceOps98,* 1998], so the derived instantaneous carrier frequency always corresponds to a sinusoidal spectrum. Since the Doppler effect concerns the arrival rate of sinusoidal wavefronts, ESA's approach represents the true Doppler shift. The DSN exploits a phase locked loop to reconstruct both the reference carrier and the Doppler. The DSN handbook [D K Shin, 202, Rev B 34-m and 70-m Doppler, 810-005 *DSN Telecommunications Link Design Handbook,* J P L, 2010] and the detailed treatment of DSN Doppler measurements by Anderson, Laing et al. reveal no cognisance of the fact that during accelerations, notably during flybys, the reconstructed carrier would be a chirp, not a sinusoid, and that the DSN measure thus cannot be the true Doppler.

The two-way Doppler shift for steady recessive motion of velocity $\upsilon$ is $\Delta v=2v\upsilon/c$, where v is the downlink carrier frequency. The Doppler rate due to acceleration a would be $d(\Delta v)/dt=2va/c$, so the fractional rate of the carrier frequency would be $\beta=v^{-1}d(\Delta v)/dt=2a/c$.

Though the carrier itself changes, not the DSN's selection, the Phase Gradient Patents suggest an additional shift of $\Delta v_\beta=-\beta vr/c=-2arv/c^2$, so the cycle counts yield $\Delta v'=2v\upsilon/c-2arv/c^2$, i.e., a velocity error $\Delta\upsilon=-ar/c$, so the DSN underestimates pre-encounter approach velocities and overestimates post-encounter recessions, thus inferring a false anomalous velocity gain in earth flybys. Close to periapsis, the DSN Doppler signal delay would cause the spacecraft to appear slow to arrive. The negative $\Delta\upsilon$ in Galileo's second flyby was in data so close to periapsis that the $\Delta\upsilon$ was initially thought inconclusive due to atmospheric drag. The negative $\Delta\upsilon$ in Cassini's flyby is again consistent with close tracking [M E Burton et al., "The Cassini/Huygens Venus and Earth flybys: An overview of operations and results", *J Geophys Res,* 106(A12):30099-30107, 2001].

Further, every change in a Doppler signal incurs a Doppler rate during the change. The velocity error $\Delta\upsilon=-ar/c=-a\Delta t$ thus signifies a general delay of acceleration information by the one-way signal delay $\Delta t=r/c$, and a range error $\Delta r=-\upsilon\Delta t$ if a and v vary slower than $\Delta t$. The delay varied from 93 ms at the 28,000 km range of Goldstone's loss of signal (LOS) to 44 ms at the end of the SSN tracking; these values are slightly inaccurate due to neglect of the radius of the earth.

The acceleration due to earth's gravity at LOS would be $a\approx 0.51$ m s$^{-2}$. As an estimate for the radial velocity at closest approach, the hyperbolic excess velocity Lx, =6.851 km s$^{-1}$ then predicts range errors of 665 and 645 m at the start of the Millstone and Altair tracking, respectively. The velocity at periapsis, $V_f$=12.739 km s$^{-1}$ leads to 1199 and 1236 m, respectively, expectedly larger than the reported residuals. The linearity and slopes of the residuals are consistent with decreasing range r. A higher acceleration towards Altair that would explain their differences is also consistent with the trajectory diagrams in the Antreasian and Guinn, and Anderson, Campbell et al. papers.

The velocity error at AOS $\Delta\upsilon=-a\Delta t\approx 21.4$ mm s$^{-1}$, presenting a two-way Doppler error of 603 mHz at the 8.438 GHz X-band downlink frequency, and would be interpreted as a 10.7 mm s$^{-1}$ one-way error, explains the anomaly to within 21%. Correspondingly, Canberra's latitude and the post-encounter asymptotic velocity declination of 71.96° imply a 1611 km oscillation in range, hence a diurnal Doppler oscillation of (1611/62070)×603 mHz≈15.6 mHz at the 62,070 km range at Canberra's acquisition of signal (AOS). The difference from the reported 50 mHz is partly due to a smaller declination at AOS, and in part to the DSN direction prediction issue mentioned.

B-3 Other Gaps and Opportunities in Prior Art

The performance of SSN radars is verified by optical triangulation of spacecraft, debris and meteors, so the recurring inconsistencies in DSN tracking in multiple earth flyby events, and the absence of similar inconsistency in ESA's tracking data in two carefully watched flybys, imply a dependence during accelerations on whether the Doppler is inferred from spectra with fixed frequencies, or from counting wave crests and troughs. Doppler theory fails to anticipate a general excess one-way delay when its own principle of counting cycles is followed literally.

All current treatments of travelling waves, including for antennas and in wave guides [cf. J D Jackson, *Classical Electrodynamics,* 3rd ed, Wiley, 1999], as well as rigorous diffraction theory [e.g., § 1.3.3 and § 8.3.1 of *Principles of optics: Electromagnetic theory of propagation, interference and diffraction of light,* M Born and E Wolf, 7th ed., Cambridge, 2002], consider sinusoidal travelling waves, with constant frequencies, as the only characteristic solutions. Constant frequency solutions result from explicit use of trial solutions of the form $e^{\pm i\omega t}$ to separate the time and space parts of differential equations, a technique introduced by Fourier for solving the heat equation, which is also consistent with standing wave modes in Planck's theory, and has been useful for solving classical and quantum dynamical equations [cf. *Classical Mechanics,* H Goldstein, 2nd ed., Addison-Wesley, 1980; *The Principles of Quantum Mechanics,* PAM Dirac, Cambridge, 4th ed., 1953].

However, the characteristic solutions for an invariance constraint cannot be considered complete in terms of representing all possible physics without a proof that unconstrained solutions would be impossible; any such result would also render the constraint redundant. No such checks have ever been considered for the characteristic solutions to the wave equation. Instead, preventing frequency drifts has been a goal of receiver design, as in time keeping and spectrometry, so much so that the very notion of varying frequencies remains unfamiliar, despite known uses of chirps in radars and in image processing. Constancy of frequencies is viewed almost like a law of conservation, especially following the Planck's theory, even though it is an artefact of assumptions of theory and design.

Other major ideas of physics that at first seem to contradict the very possibility of such distance proportional shifts also turn out consistent with, if not to actually favour, such a mechanism, since the prior ideas rest on assumptions in place of a detailed understanding, as follows.

a. Distance frequency errors. The flyby anomaly highlights general complacency in spectrometry in assuming the defining property of Fourier spectra, constancy of the component frequencies, in all data, since shifts corresponding to a delay in the Doppler signal cannot occur in Fourier spectra. There has been no consideration of distance proportional errors. Calibration procedures, such as those of the Hubble telescope, are limited to scale ($\gamma$) and offset ($\delta$) errors relating frequencies v, v' measured at source and at the receiver, respectively, linearly as v'=$\gamma$v+$\delta$, which does not allow for errors that correlate or grow with distance. Distance proportional errors notably affect parallax due to the finiteness of angular precision. An analogous distance term for frequency errors would require the broader relation v'=v[$\gamma$+$\epsilon$ (r/c)]+$\delta$. A mechanism causing a nonzero distance error rate $\epsilon$, as in the Pioneer anomaly, should therefore not be automatically regarded implausible.

The Hubble shifts have a similar distance proportional form but were attributed to cosmological expansion from start [E Hubble, "A Relation Between Distance and Radial Velocity among Extra-Galactic Nebulae", *PNAS*, 15:168-173, 1929]. The magnitude similarity of the clock acceleration $a_t$=-2.18×10$^{-18}$ s$^{-1}$ in the Pioneer anomaly to the Hubble constant $H_0$ is now finally recognized as a coincidence. The anomaly was also comparable to the 10$^3$ s Allan deviations $\sigma_y$ of 10$^{-12}$-10$^{-15}$ in the DSN, becoming large enough to be noticed only because of growth over years. However, as Allan deviation models assume only random residual processes with zero drift [§ VII-F of Anderson, Laing et al. report], discovery of the causative systematic took over a decade.

Allan deviation theory requires, rather than guarantee, the absence of systematics [cf. pages 64-65, D W Allan, N Ashby and C C Hodge, "The Science of Timekeeping", Hewlett Packard Application Note 1289, 1997], but all systematics considered in the DSN design were those observable, and thus large enough, in the short term [cf. § VII-§ X, Anderson, Laing et al.]. The same complacence is seen in the current use of Allan deviations in deep infra-red and radio astronomy [cf. V Ossenkopf, "The stability of spectroscopic instruments: a unified Allan variance computation scheme", *Astronomy & Astrophysics*, 479:915-926, 2008, arXiv:0712.4335]. Transitively implied is that $H_0$ is small enough, given the same magnitude and dimensions as $a_t$, to itself fit an unchecked systematic.

The Pioneer anomaly was inconsistent with a ground $\epsilon$r/c systematic, let alone relativistic causes, as the time factor yielding at was the duration of the data sets, of 8 years [§ V-B, Anderson, Laing et al.], not the round trip time of the signal. The $\epsilon$ required would be 8 y/20 h≈3500 times $a_t$ and the Allan deviations. The 10$^3$ s Allan deviations $\sigma_y$ imply a bound of $a_y$=$\sigma_y$/10$^3$ s≈10$^{-18}$ s$^{-1}$ on clock accelerations, with the same dimensions and order of magnitude as $H_0$. The distance proportionality means that, for a fractional precision $\delta$ in frequency measurements, we need reference sources at a range r≥c$\delta$/$a_y$, yielding detectable errors z≡($\Delta$v/ v)≡$a_y$(r/c)≥$\delta$, in order to detect $\epsilon$ on the order of $a_y$. However, $H_0$ has the same magnitude and the universe dims out at c/$H_0$, so no such source exists to help rule out a ground systematic as the cause of the observed Hubble flow.

b. Principle of scale. Space-time curvature was conceived as a large scale mechanism, needing no change in dynamics or in the internal structure of matter [cf. pages 1-5, A Einstein, "The Meaning of Relativity", Princeton, 1922]. The conservation of momenta is held to rule out relativistic expansion on planetary scale [Y V Dumin, "Can (dG/dt)/G Bound the Local Cosmological Dynamics?", arXiv:gr-qc/0610035v1, 2006; J G Williams, S G Turyshev and D H Boggs, "Reply to Comment by Dumin . . . ", *Phys Rev Lett*, 98:059002, arXiv:gr-qc/0612171v1, 2006]. Expansion on short scale is considered incompatible with its own observability [pages 87-89, A Eddington, "The expanding universe", Cambridge, 1933; page 719, C W Misner, K S Thorne and J A Wheeler, "Gravitation", W H Freeman, 1973; page 179, W Rindler, "Essential Relativity", 2nd ed., Springer-Verlag, 1977].

However, the principle of equivalence itself implies nonlocal variation of the velocity of light as c≈$c_0$(1+$\Delta\Phi$/c$^2$) across a relative difference $\Delta\Phi$ in the gravitational potential [eq. 3, A Einstein, "Cosmological considerations on the general theory of relativity" (1917), paper included in *The Principle of Relativity*, Dover, 1952]. Since atomic dimensions are proportional to the Bohr radius $\hbar$/$m_e$c$\alpha$, in terms of the reduced Planck's constant $\hbar$, the electronic mass $m_e$ and the fine-structure constant $\alpha$, the equivalence principle itself implies an irreducible general first order variation of all nonlocal atomic dimensions with space-time curvature, due to the factor c.

Large scale expansion resembling pure magnification, i.e., with increase of velocities and apparent nonconservation of momenta, does seem to explain dark matter as a result of geometry [J B Almeida, "A hypersphere model of the Universe—The dismissal of dark matter", arXiv:physics/ 0402075v3, February, 2004; "How much in the Universe can be explained by geometry?", arXiv:0801.4089, 2008]. This conclusion is now also supported by successful reproductions of observed velocity dispersions in independent simulations of the large scale structure [P Magain, "An expanding universe without dark matter and dark energy", arXiv:1212.1110v2, 2012].

Separately, a magnification should also manifest on short scales without the deceleration hitherto expected due to gravity [F I Cooperstock, V Faraoni and D N Vollick, "The influence of cosmological expansion on local systems", *ApJ*, 503:61-68, 1998, arXiv:astro-ph/9803097]. As a check, consider the mismatch factor of ~ 5 in the oceanic friction coefficients between laboratory measurements and the values implied by the lunar recession [K Lambeck, "Tidal dissipation in the oceans", *Phil Trans R Soc Ser A*, 287:545-594, 1977], currently attributed to underestimation for present epoch shallow seas in earlier models [B A Kagan, "Earth-Moon tidal evolution: model results and observational evidence", *Prog Oceanog*, 40:109-124, 1997]. A hypothetical apparent expansion needs to conversely explain only 3.82×$\sqrt{5}$/(1+$\sqrt{5}$)=2.64 cm y$^{-1}$ of the measured 3.82 cm y$^{-1}$ lunar recession, since the mismatch concerns dissipation, relating to the square of range drift. The remainder, 1.18 cm y$^{-1}$, is within 10% of fossil evidence going back 2.5 Gy, of 1.27 cm y$^{-1}$. With distance $r_e \approx 384.4 \times 10^6$ m to the moon, this means a fractional rate $2.64 \times 10^{-2}/384.4 \times 10^6 \approx 6.87 \times 10^{-11}$ y$^{-1} \approx 2.18 \times 10^{-18}$ s$^{-1}$, same magnitude as $a_r$ in the Pioneer anomaly, but with the sign of $H_0$. This connection was known [H A Harutyunian, "Some similarities of expansion phenomena in the vicinity of the earth and in the universe as a whole", *Astrophysics*, 38(4):667-674, 1995], but without relating to tidal friction. The International Terrestrial Reference Frame (ITRF) bound of 0.5±0.2 mm y$^{-1}$ on radial growth is cited against expanding earth theories ["Accuracy of the Terrestrial Reference Frame origin and Earth expansion", X Wu et al., *Geophy Res Lett*, 38:13, 2011], but the earth's radius $r_e \approx 6.371$ km implies $H_0 r_e \approx 0.437$ mm y$^{-1}$ for an apparent expansion, which closely fits the bound.

A mechanism to cause precisely such an apparent expansion on all scales was anticipated by a reconsideration of Eddington's unobservability argument in preprint arXiv:gr-qc/0005014 (2000). While Einstein's notion of space-time curvature is a mathematical abstraction, Eddington and the later authors cited did not formally consider the effect of local atoms on the observations of distant bodies. The treatment required is one of the analogue division, similar to that performed in using a slide rule, when obtaining a numeric value $\mathcal{N}_\mu(\xi)$ of a physical variable $\xi$ on an instrument scale marked in units of $\mu$. A similar computation is performed by analogue-to-digital circuits in digital instruments. A change of units is then governed by the product rule $\mathcal{N}_{\mu'}(\xi) = \xi/\mu' = (\mu/\mu')(\xi/\mu) = (\mu/\mu') \mathcal{N}_\mu(\xi)$, exactly as in dimensional analysis, where $\mu'$ denotes the units of a second scale. The concern here is specifically with variation of instrument scales and not of the units represented.

The overdue formal consideration is the effect on measure $\mathcal{N}_\mu(\xi)$ of a variation or a growing error in the unit of scale $\mu$. The product rule then yields the general time derivative $$d\mathcal{N}_\mu(r)/dt = d(r/\mu)/dt = \dot{r}/\mu - \dot{\mu}r/\mu^2 \equiv \mathcal{N}_\mu(\dot{r}) - \beta \mathcal{N}_\mu(r), \quad (2)$$

for a drift of rate $\dot{\mu}$ of in instrument scale markings, in measuring the distance r to a remote object, where $\beta \equiv \dot{\mu}/\mu$. The first term on the right, $\dot{r}/\mu \equiv \mathcal{N}_\mu(\dot{r})$, denotes actual velocity $v_r = \dot{r}$ from the observer. The second term, $\dot{\mu}r/\mu^2 \equiv \beta \mathcal{N}_\mu(r)$, is an apparent velocity $\beta r$, which is immune to both offset and linearity corrections, since it involves only the drift rate $\dot{\mu}$ and not the cumulative error in $\mu$. Eq. (2) amounts to $dr/dt = v_r - \beta r$, implying a velocity error proportional to distance, which anticipates Hubble's law using no mechanism outside the receiver (or observer) [cf. eq. 5.2.16, R M Wald, *General Relativity*, Chicago, 1984], let alone expansion of the entire universe. Further, the second derivative yields an apparent acceleration $a(r) = d(-\beta r)/dt = -r\dot{\beta} - \beta \dot{r} \equiv -\beta^2 r$ for a steady residual drift, corresponding to the deceleration coefficient $q \equiv -(1+\dot{H}/H^2) \equiv -(1+\dot{\beta}/\beta^2) = -1$. The value observed is $q = -1 \pm 0.4$, currently interpreted as an acceleration of expansion [A G Riess et al, "Observational evidence from supernovae for an accelerating universe . . . ", *Astro J*, 116(3): 1009-1038, 1998; A G Riess et al, "A 3% solution: . . . , *Astro J*, 730(2), 2011].

Eq. (2) complements the Phase Gradient Patents when the source distance r is expressed in terms of a wavelength λ of observation, and a drift occurs in the process of selecting λ, at a fractional rate $\beta \equiv -\dot{\lambda}/\lambda$. Since the ratio $2\pi \mathcal{N}_\lambda(r) = 2\pi r/\lambda = kr$ represents the total phase lag $\phi(r)$, it implies a shift $\dot{\phi}(r) = -\beta \mathcal{N}_\lambda r)/2\pi = -\beta \phi(r)$ in all observations at wavelength λ involving a residual drift of rate β. The immeasurability of the phase $\phi$ does not limit measurement of the shifts.

Determinations of $H_0$ typically involve multiple datasets to separate out systematics and peculiar motions from the Hubble flow. The use of multiple datasets cannot suffice to eliminate drift rate systematics, however. Dimensional analysis requires that every contributing method or data set must include measurements bearing the dimension of distance, and thus also residual systematics of the instruments involved. The systematic errors would be then more likely to add up than to cancel out in the inference. In data sets involving parallax, the distance measure is $r = 2a/\tan(\theta/2) \approx a/\theta$ for an angle of parallax θ across a baseline of length a, and can incur a drift rate $\dot{\mu}_a$ in the value of a, and also a drift rate $\dot{\mu}_\theta$ in measuring θ, whose combined effect would be $$\frac{d\mathcal{N}_{\mu_a}(a)/dt}{\mathcal{N}_{\mu_\theta}(\theta)} - \frac{\mathcal{N}_{\mu_a}(a)d\mathcal{N}_{\mu_\theta}(\theta)/dt}{\mathcal{N}_{\mu_\theta}(\theta)^2} \approx \left[\frac{\dot{a}}{\theta} - \frac{a\dot{\theta}}{\theta\theta}\right] - \left[\beta_a \frac{a}{\theta} - \beta_\theta \frac{a\theta}{\theta^2}\right] \equiv \quad (3)$$

$$\frac{\dot{a}}{\theta} - r\frac{\dot{\theta}}{\theta} - r[\beta_a - \beta_\theta].$$

The first term $\dot{a}/\theta$ in the result is a generally small apparent, range-invariant velocity due to baseline drift. The second term denotes actual velocity of the observed source relative to the observer. The last term denotes calibration-immune range proportional velocity errors unlikely to cancel out. The farthest distance scales actually rely on spectrometry for redshifts, and on the time dilations, which relate to spectrometry via eq. (1), hence the residual errors in large combinations of data sets would have a Gaussian distribution, but its mean cannot be assumed a priori to vanish.

In particular, as explained in the SPIE paper, a compressive tidal stress exists everywhere within the solar system. A residual plastic flow under a rotating or oscillating component would be dictated in sign by the compression, and in magnitude, by the component rate and temperature only. Both Allan deviations and $H_0$ fall well in range of the predicted magnitudes.

c. Other sub-Allan systematics. There is evidence for other systematics of small magnitudes, and of the same sign, consistent with a common, causative residual plastic flow. An increase in the scale of planetary orbits of 15 cm y$^{-1}$ per astronomical unit (AU) across three decades of "radiometric measurements" is reported by G A Krasinsky and V A Brumberg ["Secular increase of astronomical unit . . . ", *Celest Mech Dynam Astron*, 90(3), 2004]. An expansion at the cosmological fractional rate $H_0$ should have been $H_0 \times 1$ AU/c $\approx 1.03$ km y$^{-1}$. The reported value makes sense as an independent systematic in the radar round trip times, instead of the Doppler velocities in lunar recession data. The fractional rate $3.2 \times 10^{-20}$ s$^{-1}$ is also too small to detect given atomic clock Allan deviations of $10^{-15}$-$10^{-18}$. A secular growth of 3.5 mm y$^{-1}$ in the eccentricity of the lunar orbit [J G Williams and D H Boggs *Proc 16th Intl Wkshop Laser Ranging*, 2009, Poland], is independent of the 2.64 cm y$^{-1}$ lunar Doppler recession error, and its fractional rate of $3 \times 10^{-19}$ s$^{-1}$ is again below the detectability bound implied by the Allan deviations. Both systematics are growths, consistent with instrument scales shrinking due to plasticity, under a net compressive stress.

d. Nuclear abundances and the background radiation. Inability of stellar processes to explain 90% of the observed helium in the single generation of galaxies allowed in big bang theory [F Hoyle and R J Taylor, *Nature*, 203(108), 1964] is the problem that led to primordial nucleosynthesis theory that attributes these excess abundances to radiation decoupling and subsequent particle interactions in cooling from an initially hot matter-free universe. The initial state and cooling would be unexpected if the expansion were purely an artefact of space-time topology, and was thus a specific assumption [S Chandrasekhar and I R Heinrich, "An Attempt to Interpret the Relative Abundances of the Elements and their Isotopes", ApJ, 95(228), 1942]. Anisotropies in the relict radiation, considered a confirmation of "the standard model of cosmology", are predicted by inflation, another hypothesis meant to solve the horizon, isotropy and flatness problems in the cooling premise [§ 21.2.4, § 21.3.5, K A Olive and J A Peacock, "Review of Particle Physics", Phys Rev D, 86(1), 2012].

However, the nuclear abundances, the Planck's law form of the relict radiation, and its anisotropies would all be more easily explained by, and thus more strongly support, an infinite past. The nuclear abundances are easily explained by an infinite number of past stellar lifecycles because some fraction of the nuclei produced in each stellar process survives their parent stars, and thus accumulates over successive stellar lifecycles. More particularly, the thermodynamic notion of ergodicity implies the same result from an infinite number of past stellar cycles as condensation from a primordial state, thus explaining the homogeneity and isotropy. The horizon and isotropy problems vanish, obviating inflation. The radiation residue would still have anisotropies due to distant processes in our visible neighbourhood. Effects like the Sunyaev-Zel'dovich shift of the background spectrum, by scattering en route, merely describes superimposition of the expansion. This vastly simpler explanation would be invalidated by a single species of nucleii impossible from stellar processes, but none is known.

Big bang nucleosynthesis was historically an exercise to fit, in retrospect, the results of an infinite past into $H_0^{-1} \approx 2.7 T_\odot$, where $T_\odot \equiv 4.9$ Gy, the sun's age [A A Penzias, "The Origin of Elements", Nobel Lecture, 1978], so as to portray the universe as barely older than our galaxy [cf. M Bergemann et al., "The Gaia-ESO Survey: radial metallicity gradients and age-metallicity relation of stars in the Milky Way disk", arXiv: 1401.4437, 2014].

e. Olbers' paradox. The darkness of the night sky led Kepler to reject, in 1610, the infinite steady state universe proposed by T Digges in 1576, reasoning that the inverse square attenuation of light would be balanced by growth in the number of stars with the square of distance, so the sky should have been uniformly as bright as the sun. Herschel noted in 1831 that the darkness cannot be due to dust, as the dust would have heated up and reached radiative equilibrium. The redshifts explain only a third of the dimming of light [P S Wesson, K Valle and R Stabell, ApJ, 317:601-606, 1987; P S Wesson, ApJ, 367:399-406, 1991]. Current explanation, given by Lord Kelvin in 1901 and revived by E R Harrison for the big bang theory [Nature, 204:271, 1964; Darkness at Night, Harvard, 1987], is the finite age $H_0^{-1} \approx 13.8$ Gy of the universe, and 10 Gy lifetimes of stars. A finite universe is implicit in relativistic theory, and implies gravitational deceleration, which is contradicted by the observed coefficient of q=−1, as explained following eq. (2) differently from the prevailing view.

The current ideas thus rest on Kepler's assumptions a half century before Grimaldi's discovery of diffraction (1665), and a full century before the wave theory (Young in 1803, Fresnel in 1814-1821), that the intensities of arriving stellar rays follow the inverse square law all the way, but the inverse square law only concerns free space, with no interactions with matter. In the real universe, some of the rays adjacent to those that arrive on earth would be absorbed or scattered en route by matter. In Huygens' construction, the contribution of wavefronts from the arriving rays to these adjacent rays would be undercompensated, resulting in diffractive loss. This loss leads to the factor of 2 in Babinet's principle equating the diffractive loss in dust extinction to the physical cross-section.

Following Herschel's argument, only single layer dust extinction models are currently employed, so the loss seems bound by the Babinet factor. Herschel's argument is fallacious for diffractive loss, however, since diffraction concerns rays not absorbed by matter, and moreover, the loss required to explain the night sky concerns only our cosmological neighbourhood, so radiative equilibrium is no more an issue than in Kelvin's theory. As such, a loss rate σ, yielding $I(r)=I_0 e^{-\sigma r}/r^2$, is the correct general form of the Babinet loss, and defines the propagation law for real space. The difference in brightness between the sun and the night sky is just about 130 dB [F E Roach and J L Gordon, The light of the night sky, D Riedel, 1973], so the loss rate is less than σ=130 dB/13.8 Gy≈$10^{-8}$ dB $y^{-1}$ or 0.03 dB $Mpc^{-1}$, and simply too small to dismiss by current data.

f. Primevality at extreme redshifts. Objects at extreme redshifts are observed through gaps between the nearer galaxies, in Hubble Deep (HDF) and Ultra Deep Fields (HUDF) and the GOODS images. The widest, GOODS, is only 21' of arc wide and 16' high, but over 13 Gy deep. The gravitational lensing shows that the observed rays passed nearer objects within and around these fields at grazing angles that would accentuate diffraction. A rigorous treatment must account for $O(10^4)$ peripheral galaxies, each with countless stars and nonluminous bodies to obstruct the neighbouring rays.

The loss predicted by Fresnel theory for grazing angle and shadow regions gets compounded at each successive obstruction [L E Vogler, "The attenuation of Electromagnetic Waves by Multiple Knife-Edge Diffraction", US Dept of Commerce, NTIA report 81-86, 1981]. This loss has been well modelled and verified in cellular communication [cf. S R Saunders, "Diffraction Modelling of Mobile Radio Wave Propagation in Built-up Areas", PhD Thesis, EE, Brunei Univ, 1991; J V Rodriguez, J M M C Pardo and L Juan-Liácer, "A new solution expressed in terms of UTD coefficients for the multiple diffraction of spherical waves by a series of buildings", Radio Sci, 42, 2007] as well as for satellite communication [P R Pollock, "A model to predict diffraction attenuation resulting from signal propagation over terrain in low earth orbit satellite systems", PhD thesis, AFIT, Wright-Patterson Air Force Base, 2001]. Although much larger distances, and shorter, optical wavelengths, are involved in the observations, enormously larger number of objects are encountered at the grazing angles. A discrepancy factor of 5 in intergalactic hydrogen photoionization suggests a higher galactic escape fraction of ultra-violet photons at low z [A Kollmeier et al, "The Photon Underproduction Crisis", arXiv:astro-ph/1404.2933, ApJ Lett, 789(2), 2014]. Conversely implied is a weaker loss of the outbound rays at shorter wavelengths, consistent with diffractive loss of longer wavelengths.

The clear preponderance of primitive, or metal-deficient, galaxies in Hubble Deep Field (HDF) and Ultra Deep Field (UDF) at extremely high redshifts [cf. B G Elmegreen et al, ApJ, 634:101-108, 2005; D M Elmegreen et al, ApJ, 658: 763-777, 2007] also fits this model. Dust around nearer objects surrounding the deep fields would be younger and thus metallic, and would therefore absorb or scatter metallic spectral lines from the adjacent rays, so the arriving rays show greater loss of the metallic lines. As the deep field objects are already almost too faint for observation, this selective loss, though weaker, would be adequate to suppress entire structures like spiral arms, which would be metal-rich [cf. E J Nelson et al, "Spatially resolved Halpha maps and sizes of 57 strongly star-forming galaxies at z~ 1 from 3D-HST: evidence for rapid inside-out assembly of disk galaxies", arXiv:1202.1822, *ApJ*, 2012], explaining the primitivity and incompleteness of these objects.

There is thus opportunity and need for travelling wave solutions to be constructed by spectral selection or decomposition allowing for nonconstant frequencies.

SUMMARY OF THE INVENTION

The foregoing purposes, as well as others that will be apparent, are achieved by providing travelling wave solutions as spectral components of electromagnetic, acoustic or other waves travelling at finite speeds to a receiver from one or more sources located at various distances from the receiver, the spectral components having continuous monotonic variation with time at the receiver in one or more properties other than phase and amplitude, and methods for obtaining such spectral components.

The invention exploits the facts that a spectrum and its components are by definition artefacts of computation implicit in spectral decomposition or selection, even if the computation is analogue, such as by a diffraction grating in an optical spectrometer; that spectral decomposition or selectivity is generally involved, entailing integration over time of the product of arriving wave values with kernel functions, and provides the spectral components as periodic functions of time having distinct frequencies. The inventive travelling wave solutions, as spectral components, additionally involve distances from their sources along with time, and are thus physically significant also as entities relating frequency values all the way to the sources.

More particularly, the inventive travelling wave solutions are constructed at a receiver by varying continuously over time one or more reference quantities in the spectral decomposition or selection at the receiver, so as to induce the continuous monotonic variation with time in the one or more properties other than phase or amplitude of the travelling wave solutions. The reference quantities correspond to the frequencies of kernel functions in the integration, so their variation, which is equivalent to the spectral phase gradient of the Phase Gradient Patents, needs to be continuous and monotonic only over each integration. The induction of continuous monotonic variation with time in the one or more properties other than phase or amplitude of the travelling wave solutions by the variation of the reference quantities is a consequence of the integration.

Spectral decomposition or selection with variation of frequencies of the kernel functions cannot result in Fourier spectra or the sinusoidal travelling wave solutions of prior art, because the latter are both defined by the constancy of the frequencies in the kernel functions. With the continuous variation of the reference quantities, successive cycles at each frequency are counted into successive bins in the transform computation, so that each bin bears counts of cycles at successively different frequencies, as inadvertently provided by the DSN cycle counters during accelerations, whereas the Fourier transform requires each bin to count a single frequency.

The inventive travelling wave solutions are thus more general, both in representing variations of the reference quantities with time in the spectral decomposition or selection at the receiver, and in exhibiting variations with time in their own properties other than phase or amplitude.

Advantage over the travelling wave solutions of prior art lies in lags in the monotonically varying properties resulting from suspension of the variation during the travel from the wave sources to the receiver, and thereby proportional to the travelled distances or times. The suspension of variation during travel is guaranteed by d'Alembert's principle that defines the general solutions for travelling wave equations, which have the general form $(\partial^2/\partial r^2 - c^2 \partial^2/\partial t^2)\psi(r, t) = 0$, where r is the distance from a wave source, c is the wave speed, and t is time measured at the receiver, as functions of the form $\psi(r \pm ct) \equiv \psi(t \mp r/c)$. Since $\psi$ must be a function of the sum $(t \mp r/c)$, but not necessarily of time t or of distance r separately as hitherto assumed, its shape, and properties characterizing the shape, cannot change for any fixed value of the sum $(t \mp r/c)$, i.e., during travel.

The invention thus concerns wavelength and frequency, time scale factors like a in the wavelet transform $F_{\psi a, b} = |a|^{-1/2} \int \bar{\psi}([t-b]/a) f(t) dt$, polarization when the waves are transverse, as well as combinations or functions of such properties. The amplitude usually decreases during travel in ways that make lags in amplitude unreliable as measures of the travelled distance or time. Phases of individual components are excluded as well because phase lags repeat over each cycle, and are thus again unreliable as monotonic measures of the travelled distance and time.

The plane of polarization is included as it can be varied slowly enough to be in effect monotonic over the range of distances or travel times of interest in a given application. The reference quantities to be varied for inducing the continuous monotonic variation of the plane of polarization would be parameters controlling the orientation of the receiver's antenna during the integration, instead of kernel phases, so the spectral decomposition or selection can be kept otherwise unchanged.

Travelling wave spectral components originating from a distant source are thus characterized at the receiver by lags in monotonic time variation of travel invariant properties, and are included in the invention. Time domain waveforms reconstructed at the receiver from the inventive travelling wave spectral components would be mathematically equivalent to the inventive travelling wave spectral components via an inverse transform, such as considered in eq. (1), and as such are included in the invention. Linear and exponential variations would be simplest analytically and for implementation, but arbitrary monotonic variations are allowed and envisaged within the scope of the invention, so that the resulting lags would be described in general using a Taylor series expansion as $$\Delta \xi \equiv \xi(t) - \xi(t-r/c) = \dot{\xi}r/c - \ddot{\xi}(r/c)^2/2! + \ldots \equiv \xi(t)[\beta r/c - \beta^{(1)}(r/c)^2/2! + \ldots] \quad (4)$$

where $\xi(t)$ denotes the monotonically varied property excluding amplitude and phase of the inventive travelling wave solutions; $\beta \equiv \dot{\xi}/\xi$ is the fractional rate of the variation of $\xi$; and $\beta^{(1)} \equiv \xi^{-1} d^2\xi/dt^2$, $\beta^{(2)} \equiv \xi^{-1} d^3\xi/dt^3$, and so on, are the instantaneous higher order fractional derivatives of $\xi$ at the receiver. Since discontinuous variations entail derivatives of infinite order, and only a finite number of derivatives of $\xi$ can be realized by an electronic circuit or mechanical design with a finite number of components, the achieved variations of $\xi$ would be generally smooth.

The lags in the time scales of time domain waveforms reconstructed from the inventive travelling wave spectral components with monotonic variation of frequency signify distance proportional time dilations to a first order. As each spectral decomposition or selection process yields a single inventive travelling wave spectrum with lags and time dilations by a single fractional rate, the observability of waves at arbitrary time dilations is simply equivalent to their independent observability by multiple receivers in prior art. Further, the lags would not be observable at a wave source due to the distance proportionality. The lagging properties represent past spectral states of the wave source that would evolve to their values at the wave source if they could evolve at the same rates of variation for the time needed for travel by the travelling wave spectral components to the receiver. The lags more strictly correspond to the time of travel, as the wave speed c decreases, for instance, in waveguides, transmission lines and refractive media. By the proportionality to the travelled times, and therefore also of distances travelled, from the wave sources to the receiver, all such lags represent the physical information of the travelled times and distances, and would be independent of, and additional to, modulation or encoding that might be performed at one or more of the wave sources.

Advantage over CW-FM radars and the known mechanisms of echo location in nature, in which the distance information is derived from the beat frequency oscillation, which is also a lag, produced by each returning echo against the instantaneous outgoing transmitter signal, is that the inventive travelling wave solutions, as spectral components, would be available for all wave sources, with lags representing the physical information of their respective distances from the receiver, instead of only in returning echoes, and without requiring frequency modulation at the wave sources.

Advantage over the cosmological shifts and time dilations, which are also distance proportional by Hubble's law, lies in inherent linearity of the distance scale with the magnitude scale and sign of the lags being determined solely by the receiver's implementation of the fractional rate of variation in its spectral decomposition or selection providing the travelling wave spectral components, instead of the circumstances of the universe. Realized fractional rates would be generally many orders larger than the Hubble constant HQ, since HQ is small relative to the Allan deviations defining the limits of current technology. Large fractional rates would be needed to produce useful lags over the distances generally involved in most communication and ranging applications in any case.

Advantage over the range proportional shifts in NASA's tracking of earth flybys of spacecraft, inferred in the Background, lies again in the receiver's control of the magnitude scale and sign of the lags, instead of the special circumstance of spacecraft acceleration relative to the ground stations.

Advantage over the distance proportional shifts provided by the Phase Gradient Patents lies in the assurance, by d'Alembert's principle for all travelling wave solutions, that the shifted frequencies and wavelengths of the inventive travelling wave spectral components obtained at the receiver would have in effect originated at the wave sources and arrived at the receiver with no change due to the travel from the wave sources. More particularly, the instantaneous distributions of phase across a carrier frequency and its modulation side-bands at the wave sources would be reproduced identically in the inventive travelling wave spectral components obtained at the receiver. Further advantage thus lies in the assurance of full recoverability at the receiver of information modulated or encoded at the wave sources by demodulation or decoding applied to the inventive travelling wave spectral components obtained by spectral selection of the carrier frequency at the receiver, so long as the spectral selection admits the corresponding modulation side-bands, subject only to time dilations in the reconstructed signals absent in conventional up- or down-conversion of frequency.

A related advantage arises both over the Phase Gradient Patents, for ranging, i.e., determining the distance of a wave source, and over the Multiplexing Patent, for separating signals transmitted at the same frequencies from multiple wave sources, as an opportunity at a receiver to correlate in phase two or more sets of the inventive travelling wave spectral components, each set exhibiting a different fractional rate of variation ($\beta$) and its derivatives and thereby received at correspondingly different shifted frequencies. The corrections for the time scale differences of recovered modulated or encoded information would be trivial especially in digital implementations.

If $\xi_0$ denotes the current value of frequency or wavelength at a wave source, its shifted values at the receiver due to the lags (eq. 4) would be $\xi=\xi_0(1+\beta r/c+ \ldots )$, with two unknowns, r and $\xi_0$, because the wave speed c would be independently known and the fractional rate $\beta$ and its derivatives are determined by the variation of reference quantities at the receiver. A second set of travelling wave spectral components bearing a different fractional rate $\beta'\neq\beta$ and its derivatives would yield the values $\xi'=\xi_0(1+\beta'r/c)$, so that both $\xi_0$ and r can be determined, as $r=c(\xi-\xi')/(\beta-\beta')$ and $\xi_0=\xi/(1+\beta r/c)$. The second set of components reduce to Fourier spectra in the limiting case of $\beta'=0$ when $\xi$ denotes frequency or wavelength, and is thus equivalent to independent knowledge of the value of $\xi$ at the wave source. Combining two or more fractional rates for inferring the range to a wave source without knowledge of its frequency amounts to parallax in the frequency domain, as described in the first Phase Gradient Patent. In the reverse use for signal separation, the inputs to the correlation would have asymmetric contributions of signals from the different wave sources, depending on which shifted frequency bands are used for obtaining the inventive travelling wave spectral components. The correlation would enhance the signals of some of the wave sources and suppress those of the other wave sources. The inventive travelling wave spectral components enable correlation by phase, which is advantageous for both range resolution and signal isolation.

All of the preceding advantages also arise with the inventive travelling wave solutions exhibiting effectively monotonic variation in the plane of polarization, with a further advantage of not requiring correction for time dilations that would accompany monotonic variation in frequencies.

Additional advantages result over the Multiplexing Patent from the assurance of recovering, at a receiver, a modulated or encoded signal from the inventive travelling wave spectral components from the signal's source, and bearing the modulated or encoded signal, but obtained at the receiver at a preferred frequency different from the carrier frequency used for the modulation or encoding at the signal's source, by varying the one or more reference quantities in its spectral decomposition or selection at a suitable rate so as to cause frequency lags in the obtained inventive travelling wave spectral components equal to the difference between the preferred and the carrier frequencies.

A first additional advantage lies in enabling the receiver to recover a signal modulated or encoded at an arbitrary carrier frequency at the signal's source, at a preferred frequency admitted by the receiver's aperture or antenna front-end, potentially simplifying the receiver's design and extending the range of carrier frequencies that can be received and demodulated or decoded by the receiver.

A second such advantage lies in enabling the receiver to recover a signal modulated or encoded at the signal's source at a carrier frequency that would be obstructed on the wave path, by choosing a frequency that would not be so obstructed as the preferred frequency for obtaining the inventive travelling wave spectral components from the signal's source with the modulated or encoded signal, thereby overcoming or bypassing the obstruction. Obstructions that would be overcome or bypassed include wavelength-specific attenuation due to a medium or channel in the wave path, and jamming or interference at the carrier frequency of the modulation or encoding at the signal's source.

A third such advantage lies in enabling a receiver located at one end of a waveguide or channel that limits transmission to a narrow band around a preferred frequency, to recover, simultaneously or in a time sliced manner, one or more signals modulated or encoded at different carrier frequencies from sources connected to the other end of the waveguide or channel, and thus at nearly the same effective distance, defined by the waveguide or channel, from the receiver, by obtaining the inventive travelling wave spectral components from the source of each signal at the preferred frequency.

The inventive travelling wave spectral components corresponding to each source would be then obtained by spectral decomposition or selection using a distinct specific rate of variation of the one or more reference quantities, so as to cause frequency lags in the obtained inventive travelling wave spectral components equal to the difference of the preferred frequency from the carrier frequency used for modulation or encoding at that source. The inventive travelling wave spectral components for each signal thus obtained would bear a distinct induced fractional rate of variation of frequency, making them orthogonal to the inventive travelling wave spectral components yielding each of the other signals also recovered by the receiver. The inventive travelling wave spectral components for all of the one or more signals would be thus independently and simultaneously received over the same narrow band around the preferred frequency in the waveguide or channel, so the capacity of the waveguide or channel, as defined in communication theory, would be effectively multiplied.

An advantage over the Frequency Generation Patent arises from the assurance that the inventive travelling wave spectral components obtained with frequency or wavelength lags at a receiver would have started out from their sources at the obtained lagging frequencies or wavelengths, in that the obtained inventive travelling wave spectral components would thereby bear the effects of interaction with objects or media at the obtained frequencies or wavelengths en route from the wave source to the receiver, and can be used to measure those effects, or to image features or characteristics of the en route objects or media at the obtained frequencies or wavelengths. The advantage lies in the consistency of the measurements and images all the way from the wave source with the frequencies or wavelengths obtained at the receiver.

Other objects, features and advantages of the various embodiments of the spectral components and methods for obtaining the spectral components disclosed herein are explained in the following Detailed Description with reference to the appended drawings.

BRIEF DESCRIPTION OF THE DRAWINGS

FIGS. 1a and 1b illustrate sinusoidal and chirp travelling waves, respectively, and their phase and frequency lags implied by the d'Alembertian principle of shape invariance of waves in travel.

FIG. 2a is a distance-time-frequency diagram explaining the frequency lags and time dilations of the inventive chirp components as past states of the source chirp spectrum, and their occurrence as the result of the finite speed and shape invariance of travelling waves.

FIG. 2b illustrates the source time-frequency plane of FIG. 2a in more detail.

FIG. 3 is a schematic diagram illustrating a direct conversion radio receiver exploiting the chirp travelling wave components of the present invention.

FIG. 4 is a schematic diagram illustrating a superheterodyne radio receiver exploiting the chirp travelling wave components of the present invention.

FIG. 5 is a schematic diagram illustrating a heterodyne method for realizing the variation of one or more local oscillator frequencies needed in the radio receivers of FIGS. 3 and 4.

FIG. 6 is a schematic diagram showing how the heterodyning method of FIG. 5 may be integrated into the radio receiver of FIG. 4.

FIG. 7 is a schematic diagram showing an alternative arrangement for the radio receiver of FIG. 6.

FIG. 8 is a schematic diagram illustrating a radio receiver using a phase locked loop for carrier recovery adapted to exploit the chirp travelling wave components of the present invention.

FIG. 9a is a distance-frequency diagram reproduced from the Multiplexing Patent illustrating parallax in frequency domain provided by the inventive chirp solutions, and its use for separating signals by source distance, without depending on the carrier frequency, time slot, or code.

FIG. 9b is a distance-frequency diagram related to FIG. 9a, illustrating phase correlation of the inventive chirp spectra with Fourier spectra of the same signals.

FIG. 10a is a schematic diagram illustrating transmission of multiple signals over a common channel of fixed length and limited transmission bandwidth, using the fractional rate parameter of the inventive chirp spectral components to differentiate between the signals.

FIG. 10b is a schematic diagram illustrating the use of the fractional rate parameter of the inventive chirp spectral components for characterizing a transmission channel or imaging objects at arbitrary wavelengths using waves of a fixed wavelengths from a wave source.

FIG. 11 is a graph of the SSN range residuals during the 1998 earth flyby of NEAR, reproduced from Antreasian and Guinn's paper, to illustrate the delay of DSN Doppler data.

FIG. 12a is a graph that compares the true approach and the delayed Doppler velocity profiles due to the DSN receiver design, according to the theory of the present invention, to explain both the positive and negative $\Delta\upsilon$ anomalies hitherto observed in various earth flybys.

FIG. 12b is a related graph that explains the $\Delta\upsilon$-adjusted post-encounter estimated trajectory and the apparent reducibility of the flyby anomalies by $\Delta\upsilon$ estimation.

DETAILED DESCRIPTION

The core notions of travelling waves represented by d'Alembertian solutions, and the distinction of the travel invariance of frequency and wavelength from variation at a wave source or at a receiver, along with the origin of lags due to finite wave speeds, are explained first in Section A, with FIGS. 1a and 1b. The inventive travelling wave spectral components are described in terms of the spectral decompositions at the wave source and the receiver with FIGS. 2a and 2b in Section B.

Applications of the distance information represented by the lags would include reliable ranging of distant sources without requiring a "ladder" of distant standard candles to construct the scale of distances, as in astrophysics, and multiplexing by source distances, including over air for WiFi and cellular communication, but without the power control constraints of FDMA (frequency division multiple access) or CDMA (code division), and independently of modulation or encoding.

The distance information is revisited in Section D, with FIG. 9a from the Multiplexing Patent, to explain an indeterminacy of source distances with the inventive travelling wave spectral components bearing a single rate of change, and with FIG. 9b, illustrating correlation of the inventive travelling wave spectral components with simultaneously obtained Fourier components that resolves this issue. The treatment also shows that the correlation improves with the number of distinct rates of change used, and that physical access to the source for determining the lags is indeed obviated.

Applications of the travel invariance obtained as a d'Alembertian characteristic include channel capacity multiplication, reception from sources transmitting at frequencies or wavelengths that may be obstructed or jammed en route, described with FIG. 10a, and imaging at arbitrary wavelengths independently of the illumination, described with FIG. 10b, in Section E.

Mathematical treatment is given in Section C for exponential chirp travelling wave solutions as the simplest embodiments with continuous monotonic variation in frequency and wavelength, corresponding to constant fractional rates of change $\beta$ in eq. (4). The treatment includes the generalized orthogonality and Parseval-Plancherel theorems, and establishes, with reasoning similar to Fermat's principle of optics, that the waveforms obtained would indeed always correspond to the fractional rates of change applied to reference quantities in the spectral decomposition or selection. An implication of direct interaction with sources is discussed in Section C-5 for electromagnetic and acoustic waves, relating the frequency lags to inherent independence of source and receiver clocks and the principle of scale treated in the Background. Equivalence of the optical and DFT embodiments of the Phase Gradient Patents to nonconstant binning is proved in Section C-7.

Application to time varying resonant circuits or filters, and to communication in general, calls for different considerations of temporal signals as modulation would overlap the frequency variation in the chirp components. Treatment of down-translation, demodulation and phase lock loops used for carrier tracking or recovery is given in Section C-8, and shown consistent with the given explanation of the flyby anomaly, due to unintended phase lock of the DSN receiver to chirp spectral components of the downlink signal, in Section F. Properties and uses of the inventive travelling wave spectral components with continuous monotonic variation in polarization are discussed in Section G.

A. Generality of Lags in Travelling Waves

FIGS. 1a and 1b are time-distance diagrams illustrating sinusoidal and chirp travelling wave solutions, respectively, that arrive at a receiver from a source S at distance r from the receiver R, and the lags that result from the invariance of their shapes and dimensions over travel. The time axis (12) marks time t increasing to the right in both figures. The instantaneous phase $\phi(t)$ has a leftward motion, as indicated by the horizontal arrows, as it evolves over time, in both waveforms (21) seen at the source, and (22) seen at the receiver. As the invention concerns travelling waves in general, including sound, relativistic space-time curvature is not of concern in the treatment. The invention concerns information a receiver may obtain or infer about wave sources through waves alone, hence all of its observations and inferences would be adequately represented by the receiver's clock. In particular, the time $\Delta t = r/c$ required by the waves to travel from a source S' to a receiver R, on the distance axis (11), must be accounted for by the receiver's clock in all received waves.

The dotted lines (31) relate points on the source (21) and receiver waveforms (22) that represent the same positions on the respective waveforms. This correspondence, which also signifies causality, would be simple if the waveforms have definite start times, as depicted, but that is never the case for spectral components, which, as analytical constructs, extend to $t = \pm\infty$. The impossibility of strictly monochromatic waves with finite start or end times is a known result of Fourier transforms. The proof, included as a lemma in the SPIE paper, lies in the equivalence of a waveform bounded in time to a product of the same waveform extending to $\pm\infty$ and a step function representing the time bounds. The Fourier spectrum of their product then becomes the convolution product of their spectra, and extends to $\pm\infty$, because the spectrum of the step function alone extends to $\pm\infty$.

Transmission frequency or wavelength bands are chosen in wave guides and optical fibres, as well as in transmission lines on printed circuit boards (PCB) and in integrated circuit (IC) chips, to minimize dispersion effects. It is therefore generally safe to ignore the dispersion effects in such media in considering the present invention. The parallelism of the dotted lines (31) illustrates the resulting constancy of the wave speed for the period in consideration, as well as across wavelengths in FIG. 1b, where the wavelength $\lambda$ varies with time t along the chirp, so that $\lambda_3 < \lambda_2 < \lambda_1$.

The figures also illustrate a basic distinction between the invariance of d'Alembertian properties during travel from their evolution over time locally at the source and at the receiver, and the origin of the lags in these properties due to the constancy in travel. In the chirp waveform of FIG. 1b, its frequency and wavelength lags would vanish, notwithstanding the travel delay $\Delta t = t_2 - t_0$, if, and only if the wavelength of its first cycle (23) decreased from $\lambda_1$ at $t_0$ to $\lambda_4$ at $t_2$ by the time it arrived as the first cycle (24) at the receiver. However, a change of wavelength in travel necessarily means that the successive wavefronts, i.e., surfaces denoting constant phase, had different speeds. For instance, the first cycle (23) would be shorter at $t_2$, so as to match the gap between the leading (44) and trailing (43) edges of the source cycle at $t_2$, if and only if its leading edge (42) travelled slower than its trailing edge (41), reducing their gap during travel.

Such variations in speed would relate to dispersion, because the leading and trailing wavefronts belong to somewhat differing wavelengths in the chirp waveform of FIG. 1b. The common intuitions that find the distance proportional shifts of the Phase Gradient Patents impossible and violative of causality, instead themselves require assuming an inherent dispersion in nature, even for acoustic waves, to predicate the absence of such shifts in the inventive chirp travelling wave solutions. The hypothetical dispersion would have to be additionally proportional to $\beta$, because a chirp waveform with fractional rate of change $\beta' > \beta$ needs to reduce from $\lambda_1$ to $\lambda'_4 < \lambda_4$ over the same travel, and the dispersion should vanish in the limit $\beta \to 0$, i.e., the prejudicial intuitions would further require the inherent dispersion to depend on the receiver's selection of β, and cannot be correct.

Conversely, in absence of such hypotheses, the leading (46) and trailing (45) edges must exhibit the same separation upon arriving at the receiver as they did at the source ((42), (41) respectively), and thus yield a lag in the gap relative to the leading (44) and the trailing (43) edges at the source at the arrival time $t_2$. Such lags are in any case known from CW-FM radars and echo-location in bats—the difference here is that the lags are obtained in chirp spectra.

B. Relation of Spectra Across Space and Time

FIG. 2a is a distance, time and frequency diagram explaining how the component frequencies relate over time and between the source and the receiver locations. Lines S-$S_T$ (13) and S-$S_\Omega$ (15) denote the time and frequency axes, respectively, at the source location S. Lines R-$R_T$ (14) and R-$R_\Omega$ (16) denote the corresponding time and component frequency axes, respectively, at receiver location R. The horizontal plane S-$S_\Omega$-R-$R_\Omega$ denotes the present time corresponding to $t_2$ in FIG. 1b. Past frequencies of the components are shown above the plane S-$S_\Omega$-R-$R_\Omega$ in FIG. 2a, consistent with the downward direction of time along the time axes S-$S_T$ (13) and R-$R_T$ (14). Each of lines J-D (63) and I-E (62) thus denotes past frequencies of the respective chirp components, whose instantaneous present frequencies, at $t_2$, are defined by the coordinate intervals S-D and S-E, respectively. The slopes of lines J-D (63) and I-E (62) denote the rates of change of frequency, $\dot{\omega} \equiv d\omega/dt = \beta\omega$.

The variation of component frequencies at a fixed value of the fractional rate of change β then yields a family of exponential curves covering the (vertical) time-frequency plane S-$S_T$-$S_\Omega$ at the source, and identified by their points of intersection with the present time plane S-$S_\Omega$-R-$R_\Omega$, such as points D and E, which identify the chirp components denoted by lines J-D (63) and I-E (62). The lines J-D (63) and I-E (62) denote segments of exponential curves, and are hence not parallel. This family of curves is clearly a single valued cover for the source time-frequency plane S-$S_T$-$S_\Omega$, i.e., exactly one member of the family passes through each point in the plane S-$S_T$-$S_\Omega$.

The dotted line N-E (61) normal to the source frequency axis S-$S_\Omega$ (15) at E likewise represents a sinusoid of frequency given by the coordinate interval |SE|, which is also the frequency of the chirp line I-E (62) at time $t_2$. The completeness of a Fourier transform concerns the coverage of the frequency axis S-$S_\Omega$ (15) by the normals, i.e., by the availability of a normal through each point on the frequency axis S-$S_\Omega$ (15) contained in the transform. The family of normals is again a complete single-valued cover for the source time-frequency plane S-$S_T$-$S_\Omega$. The plane S-$S_T$-$S_\Omega$ thus denotes the Hilbert space of source waveforms representable by sinusoids, or equivalently by chirps. Thus, the chirp and sinusoidal spectra can equally describe arbitrary energy or power distribution on the present source frequency axis S-$S_\Omega$ (15) at time $t_2$, and must also bear the same coefficients, since the coefficients denote the same magnitudes and phases at the present time $t_2$.

However, the inclination of chirp lines J-D (63) and I-E (62) signifies distorted reconstruction of waveforms in past or future, due to time dilations or compressions, respectively, given by eq. (1) for the positive values of β represented by the depicted inclinations. The distortion is of the time domain representation of the local past and future at the source, as travel is not explicit in eq. (1).

Component waveforms for the chirp lines and for the sinusoid represented by the normal N-E (61) are shown separately in FIG. 2b, to clarify how their phases evolve over time, and to illustrate how the chirp wavelengths expand in the past. Similar expansions occur along the chirp lines G-C (65) and H-F (64) in the receiver time-frequency plane R-$R_T$-$R_\Omega$. The reconstructed time domain waveforms would be then incompatible in their time scales except on the present time axes S-$S_\Omega$ (15) and R-$R_\Omega$ (16), hence each family of chirp lines, defined by a common fractional rate β (and its derivatives) is orthogonal to all other such families differing in the fractional rate (or its derivatives). Their Hilbert spaces thus intersect only at the present frequency axes, ruling out transformations between such chirp basis sets. These past spectral states are not purely conceptual, since they must relate to actual past measurements of frequency if any, and their difference of time scale could be exposed by observations at a distance or across a round trip. For example, correction were needed for the uplink oscillator drift over the round trips of tens of hours in the downlink carrier frequency measurements in the Pioneer missions, according to Anderson, Laing et al. Such corrections are not required in most terrestrial communication systems because of the shorter trip times.

In FIGS. 1a and 1b, the slope of the dotted connecting lines (31) represents the finite wave speed. The lines would be vertical, and the lags would vanish, if the speed were infinite. If the wave speed were zero, the lines would be horizontal and would not connect the source and receiver waveforms, leaving them causally unrelated. Corresponding connecting lines denoting travel in FIG. 2a must be again inclined in the direction of increasing time, and drawn parallel to the distance axis (11) to represent the invariance of frequencies during travel. Travel lines A-C (51) and K-L (52) starting from points A and K, respectively, on the source chirp line A-E, are therefore shown inclined at angle $\angle DAC = \tan^{-1}(|DC|/|AD|) = \tan^{-1}(r/\Delta t) \equiv \tan^{-1}(c)$.

Linearity of the frequency lags is illustrated by the second travel line K-L (52) from point K at time $t_1 > t_0$ on the same source chirp line A-E, and reaching point L at a shorter distance $r_1 < r$, for the correspondingly shorter delay $\Delta t_1 = t_2 - t_1$, by the time $t_2$. The linearity is due to similarity of the pairs of triangles {A-C-E, K-L-E} and {C-F-E, L-M-E}. The lags must be proportional to the inclinations $\angle AEN \equiv \angle CBF \equiv \tan^{-1}(|CF|/|CB|) = \tan^{-1}(\beta\Delta t/\Delta t) = \tan^{-1}(\beta)$.

The line A-C (51) would equally represent the sinusoid given by the normals A-D at the source and B-C at the receiver, which must deliver the same numerical amplitude or coefficient $F(\omega_1)$ at C, signifying the same power or information, to the receiver at time $t_2$. The coefficients $F(\omega)$ on the receiver frequency axis (16) must represent physical observations by the receiver at $t_2$. Whether a coefficient $F(\omega_1)$ belongs to a sinusoid B-C or to a chirp line G-C depends entirely on which line the receiver chooses to construct through the point C to represent the angular frequency $\omega_1$. If it constructs a chirp line, the source frequency implied by the connecting line A-C (51) would be still $\omega_1$ at time $t_0$ at the source, as represented by point A, but the chirp would have evolved to $\omega_4$ at the source at time $t_2$, as represented by point E, in the receiver's analysis, to pose a frequency lag $\Delta\omega = |DE| = |CF| = (\omega_4 - \omega_1)$. Conversely, the receiver can associate this chirp line and present angular frequency $\omega_4$ at E only with the coefficient received at point C.

Without shifted past states, like A for point E, distant observations would be impossible even at frequency drifts too small to detect with existing nonzero Allan deviations.

As the shifts depend only on the instantaneous source frequency $\omega_4$, the fractional rate $\beta$ and the travel time $\Delta t=r/c$, the received chirp spectrum and its lags would be as time invariant as the Fourier spectrum.

C. Mathematical Description of the Invention

The instantaneous angular frequency of an exponential chirp is given by $\omega(t)=\omega_0 e^{\beta t}$, where $\omega_0=\omega(0)$. Its instantaneous phase is $\phi(t)=\int\omega(t)dt \equiv \beta^{-1} \omega(t) = \beta^{-1}\omega_0 e^{\beta t} \approx \beta^{-1}\omega_0 + \omega_0 t + \ldots$ where the constant and higher order terms arise from the nonconstancy of frequency. The phase reduces to the sinusoidal form, $\omega_0 t$ plus a constant, in the limit $\beta \to 0$ via L'Hôpital's rule.

C-1 Chirp D'Alembertian Solutions

The phase of an exponential chirp travelling wave would be $\psi(r, t)=-\omega\beta^{-1} \exp[\beta(t\pm r/c)]$, with the travel delay $r/c$. Using $\Delta t \equiv (t-r/c)$, the first and second order derivatives would be $$\frac{\partial \psi(r, t)}{\partial r} \equiv \frac{\partial e^{-i\omega\beta^{-1}exp[\beta\Delta t]}}{\partial r} = e^{-i\omega\beta^{-1}exp[\beta\Delta t]}\frac{\partial\{-i\omega\beta^{-1}\exp[\beta\Delta t]\}}{\partial r} = \quad (5)$$

$$\psi(r, t) \cdot (-i\omega\beta^{-1}) \cdot (-\beta/c)\exp[\beta\Delta t] = \frac{i\omega}{c}\exp[\beta\Delta t]\psi(r, t)$$

whence $$\frac{\partial^2 \psi(r, t)}{\partial r^2} \equiv \frac{\partial^2 e^{-i\omega\beta^{-1}exp[\beta\Delta t]}}{\partial r^2} = \frac{\partial}{\partial r}\left[\frac{i\omega}{c}\exp[\beta\Delta t]\psi(r, t)\right] =$$

$$\frac{-i\omega\beta}{c^2}\exp[\beta\Delta t]\psi(r, t) - \frac{\omega^2}{c^2}\exp[2\beta\Delta t]\psi(r, t),$$

and likewise, $$\frac{\partial \psi(r, t)}{\partial t} \equiv \frac{\partial}{\partial t}e^{-i\omega\beta^{-1}exp[\beta\Delta t]} = e^{-i\omega\beta^{-1}exp[\beta\Delta t]}\frac{\partial}{\partial t}\{-i\omega\beta^{-1}\exp[\beta\Delta t]\} = \quad (6)$$

$$\psi(r, t) \cdot (-i\omega\beta^{-1}) \cdot (\beta)\exp[\beta\Delta t] = -i\omega\exp[\beta\Delta t]\psi(r, t)$$

yielding $$\frac{\partial^2 \psi(r, t)}{\partial t^2} \equiv \frac{\partial^2}{\partial t^2}e^{-i\omega\beta^{-1}exp[\beta\Delta t]} = \frac{\partial}{\partial t}[-i\omega\exp[\beta\Delta t]\psi(r, t)] =$$

$$-i\omega\beta\exp[\beta\Delta t]\psi(r, t) - \omega^2\exp[2\beta\Delta t]\psi(r, t),$$

implying $[\partial^2/\partial r^2 - c^{-2}\partial^2/\partial t^2]e^{-i\omega\beta^{-1}exp[\beta\Delta t]}=0$ identically, so that the one-dimensional wave equation $[\partial^2/\partial r^2 - c^{-2}\partial^2/\partial t^2]f(r,t)=0$, would be satisfied by setting $f(r, t)=e^{-i\omega\beta^{-1}exp\,\beta\Delta t}$.

Extension of this result to the complementary chirp wave function $g(r,t)=e^{-i\omega\beta^{-1}exp\,\beta(t+r/c)}$ and to three dimensional space would be straightforward. The result establishes that the inventive chirp wave functions $e^{\pm i\omega\beta^{-1}exp\,\beta(t\pm r/c)}$ are equally valid d'Alembertian solutions for representing waves as the sinusoidal wave functions of current physics. These exponential chirp waveforms can be easily combined with exponential decays of amplitude to obtain chirped eigenfunctions for the Laplace and z transforms. Their validity as wave solutions cannot be surprising in any case because, given any "retarded" (travel-delayed) functions of time $\psi(t-r/c)$, the relations $$\psi_{,t} \equiv \frac{\partial\psi}{\partial t} \equiv \frac{\partial\psi}{\partial\tau}\frac{\partial\tau}{\partial t} = \frac{\partial\psi}{\partial\tau}, \quad (7)$$

$$\psi_{,tt} \equiv \frac{\partial^2\psi}{\partial t^2} \equiv \frac{\partial}{\partial\tau}\left(\frac{\partial\psi}{\partial\tau}\frac{\partial\tau}{\partial t}\right)\frac{\partial\tau}{\partial t} = \frac{\partial^2\psi}{\partial\tau^2}, \text{ and}$$

$$\psi_{,r} \equiv \frac{\partial\psi}{\partial r} \equiv \frac{\partial\psi}{\partial\tau}\frac{\partial\tau}{\partial r} = -\frac{1}{c}\frac{\partial\psi}{\partial\tau},$$

$$\psi_{,rr} \equiv \frac{\partial^2\psi}{\partial r^2} \equiv \frac{\partial}{\partial\tau}\left(\frac{\partial\psi}{\partial\tau}\frac{\partial\tau}{\partial r}\right)\frac{\partial\tau}{\partial r} = -\frac{1}{c^2}\frac{\partial^2\psi}{\partial\tau^2}$$

follow upon substituting $\tau \equiv t-r/c$, proving that $\psi$ satisfies the wave equation. The only conditions on the solutions are the existence of first and second order derivatives, and the travel delays $r/c$.

Decomposition into any family of orthogonal functions, such as Bessel functions and Laguerre polynomials, should yield a similar continuum of alternative spectra with lags, but these alternative functions show relatively little variation of wavelength, and become indistinguishable from sinusoids, away from the origin, so their lags also level off and become unusable as a distance measure. Only linear or exponential chirps assure indefinitely linear shifts and are therefore preferred.

C-2 Hilbert Spaces of Travelling Wave Chirp Spectra

The integral of the product of a travelling wave chirp spectral component of unknown initial angular frequency $\omega'_0$ and fractional rate of change $\beta'$, arriving from a source at distance r, with a reference chirp signal of initial angular frequency $\omega_0$ and fractional rate $\beta$ at the receiver, evaluates, over a time interval T longer than several cycles and with the same notation $\Delta t \equiv (t-r/c)$, as $$\int_T e^{i\omega'_0\beta'^{-1}exp(\beta'\Delta t)}e^{-i\omega_0\beta^{-1}exp(\beta t)}dt \simeq \quad (8)$$

$$\delta(\omega'_0 e^{\beta'\Delta t} - \omega_0 e^{\beta t}) \equiv \delta(\omega'_0 e^{-\beta' r/c} - \omega_0)\delta(\beta' - \beta),$$

using Dirac's delta function, defined as $\int\delta(x)\,dx=1$ if and only if the integration includes $x=0$, since the phase of the integrand is constant only for a component that matches the reference in both $\omega_0$ and $\beta$, and oscillates otherwise. The matching component then contributes in proportion to the number of cycles in the interval $T \approx (\omega_0 T)/2\pi = v_0 T$, whereas every other component contributes at most a cycle. Eq. (8) reduces to the Fourier orthogonality theorem in the limit $\beta=\beta' \to 0$, at which the component of matching frequency again contributes to the integral in proportion to $v_0 T$, but any other component contributes over at most one cycle.

In contrast, Fourier transform theory involves convergence issues in the integration time limit $T \to \infty$ because, unlike a nonmatching chirp, every nonmatching sinusoid contributes periodically, after every so many cycles, indefinitely. The convergence is thus better assured for chirps.

The fractional rate derivatives $\beta^{(1)}$, $\beta^{(2)}$, ... contribute additional factors $\delta(\beta^{(1)}-\beta'^{(1)})$, $\delta(\beta^{(2)}-\beta'^{(2)})$, etc., hence travelling wave spectra cover a two dimensional product space $\Omega \times \mathcal{B}^* \equiv \{\omega\} \times \{\beta, \beta^{(1)}, \ldots\}$ of instantaneous frequencies and their rates of change. Prior art transforms, including Fourier, Laplace and z, as well as wavelets, comprise the null subspace $\Omega \times \{0,0,\ldots\}$, in which the fractional shifts $z=\beta r/c$ representing distance information vanish. The distance information is conversely limited to the nonnull subspace $\Omega \times [\mathcal{B}^* - \{0, 0, \ldots\}]$ describing the present invention.

Eq. (8) also results naturally by relaxing the time invariance premise in the Fourier condition, $$\int_T e^{i\omega'(t-r/c)} e^{-i\omega t} dt \equiv \int_T e^{-i\omega' r/c} e^{i(\omega'-\omega)t} dt \simeq \delta(\omega'-\omega) \int_T e^{-i\omega' r/c} dt, \quad (9)$$

as the properties of oscillation and convergence responsible for the result in eq. (8) do not depend on constancy or exponential variation of frequencies. Eq. (9) thus more generally implies that if the reference angular frequency $\omega$ is varied slowly, the product integral would be nonzero only if the component angular frequency $\omega'$ varied the same way over time, since the phase factor $e^{i(\omega-\omega')t}$ in the integrand would otherwise oscillate. The result holds for $T \to \pm\infty$ and also for finite integration times T that span a large number of cycles, for the same reason as explained for eq. (8), and is the general basis of design for realizing the inventive spectral components, both in general spectrometry and in the reception of modulated signals, as treated ahead.

As in Fourier theory, the orthogonality itself enables spectral decomposition, via the relation $$\int_T \left[ \frac{1}{2\pi} \int_{\Omega'_{\mu 0} \times \mathcal{B}'} F_{\beta'}(\omega'_{\mu 0}) \exp\left\{ i\omega'_{\mu 0} \frac{e^{\beta'[t-r/c]}}{\beta'} \right\} d\omega'_{\mu 0} d\beta' \right] \quad (10)$$

$$\exp\left\{ -i\omega_0 \frac{e^{\beta t}}{\beta} \right\} dt \approx$$

$$\frac{1}{2\pi} \int_{\Omega'_{\mu 0} \times \mathcal{B}'} F_{\beta'}(\omega'_{\mu 0}) \left[ \int_T \exp\left\{ i\omega'_{\mu 0} \frac{e^{\beta'[t-r/c]}}{\beta'} - i\omega_0 \frac{e^{\beta t}}{\beta} \right\} dt \right] d$$

$$\omega'_{\mu 0} d\beta' =$$

$$\frac{1}{2\pi} \int_{\Omega'_{\mu 0} \times \mathcal{B}'} F_{\beta'}(\omega'_{\mu 0}) \delta(\omega'_{\mu 0} e^{\beta'(t-r/c)} - \omega_0 e^{\beta t}) d\omega'_{\mu 0} d\beta' = F_\beta(\omega_0),$$

showing that the coefficient $F_\beta(\omega_0)$ of a single chirp wave component would be extracted from a linear combination of chirp wave functions $$F_{\beta'}(\omega'_{\mu 0}) e^{i\omega'_{\mu 0} \beta'^{-1} e^{\beta'[t-r/c]}}.$$

The square brackets demarcate the inverse transform yielding a time domain function $f(t-r/c)$ reconstructed from $F_{\beta'}$.

C-3 Parseval-Plancherel Theorems for Exponential Chirp Spectra

The generalized Parseval-Plancherel theorem follows again from the $L^2$ norm, for a delay $\Delta t \equiv r/c$, for a complex valued time-domain signal f and its spectral coefficients F, as $$\int_T |f(t-\Delta t)|^2 dt \equiv \int_T f^*(t-\Delta t) f(t-\Delta t) dt = \quad (11)$$

$$\int_T \left[ \int_{\Omega_\mu \times \beta} \frac{F_\beta(\omega_\mu)}{2\pi} e^{+i\omega_\mu \exp(\beta[t-\Delta t])/\beta} d\omega_\mu d\beta \right.$$

$$\left. \int_{\Omega'_\nu \times \beta'} \frac{F^*_{\beta'}(\omega'_\nu)}{(2\pi)^2} e^{-i\omega'_\nu \exp(\beta'[t-\Delta t])/\beta'} d\omega'_\nu d\beta' \right] dt =$$

-continued $$\int_T \left[ \int_{\Omega_\mu \times \beta, \Omega'_\nu \times \beta'} \frac{F_\beta(\omega_\mu) F^*_{\beta'}(\omega'_\nu)}{(2\pi)^2} e^{i\{\omega_\mu \exp(\beta[t-\Delta t])/\beta - \omega'_\nu \exp(\beta'[t-\Delta t])/\beta'\}} \right.$$

$$\left. d\omega_\mu d\beta d\omega'_\nu d\beta' \right] dt =$$

$$\int_{\Omega_\mu \times \beta, \Omega'_\nu \times \beta'} \frac{F_\beta(\omega_\mu) F^*_{\beta'}(\omega'_\nu)}{(2\pi)^2} \left[ \int_T e^{i\{\omega_\mu \exp(\beta t')/\beta - \omega'_\nu \exp(\beta' t')/\beta'\}} dt' \right]$$

$$d\omega_\mu d\beta d\omega'_\nu d\beta' (t' = t - \Delta t) =$$

$$\int_{\Omega_\mu \times \beta, \Omega'_\nu \times \beta'} \frac{F_\beta(\omega_\mu) F^*_{\beta'}(\omega'_\nu)}{(2\pi)^2} \delta(\omega_\mu e^{\beta t'} - \omega'_\nu e^{\beta' t'})$$

$$d\omega_\mu d\beta d\omega'_\nu d\beta' = \int_{\Omega_\mu \times \beta} \frac{|F_\beta(\omega_\mu)|^2}{2\pi} d\omega_\mu d\beta,$$

omitting the redundant suffix 0 for initial angular frequencies. The result reduces to the Parseval theorem for Fourier transforms at $\beta = \beta' \to 0$, implying equality of chirp and Fourier coefficients at the source, as remarked with FIG. 2a, as they describe the same oscillations at the source, i.e., $$F(\omega_\mu) \equiv \lim_{t,r \to 0} F(\omega_\mu) e^{i\omega_\mu(t-r/c)} = \quad (12)$$

$$\lim_{t,r \to 0} F_\beta(\omega_{\mu 0}) e^{i\omega_{\mu 0} \beta^{-1} \exp(\beta[t-r/c])} \equiv F_\beta(\omega_{\mu 0}),$$

using the convergence of chirp phases to Fourier values by L'Hôpital's rule.

Eq. (12) implies that all information modulated or encoded at the source is preserved, i.e., the time dilation represented by the frequency shifts alters the transmission rate, but not the content.

Eq. (11) means that the entire source energy $\int_T |f(t)|^2 dt$, along with the modulated information contained in the coefficients $F_\beta(\omega_\mu)$, would be available identically at all delays $\Delta t$, and thus over the continuum of lags and time dilations, because $\Delta t$ is absent in the coefficients and vanishes from the norm.

C-4 Analytical Origin of the Inventive Frequency Lags

Real atomic emissions, as well as communication signals any kind of modulation, invariably comprise a linear combination of tones $$\sum_j F_j e^{i\omega'_j t + i\phi'_j}.$$

At a recover at a distance r from the source, at rest relative to the source and at the same gravitational potential, the instantaneous arriving combined signal would be $$\sum_j F_j e^{i\omega'_j(t-r/c) + i\phi'_j}.$$

Its chirp transform should therefore yield $$\int_T \sum_j F_j e^{i\omega'_j(t-r/c) + i\phi'_j} e^{-i\omega\beta^{-1} \exp(\beta t)} dt \simeq$$

$$\sum_j \int_T F_j e^{-i\omega'_j r/c + i\phi'_j} \delta(\omega'_j - \omega e^{\beta t}) dt = e^{-i\omega'_j r/c + i\phi'_j} \mathcal{F}_\beta(\omega),$$

wherein the component angular frequencies $\omega'_j$ are unchanged by travel. $\{\mathcal{F}_\beta\}$ denotes the ordinary chirp spectrum, which would be flat over $\omega$ as each tone $\omega'_j$ closely matches every chirp component $\mathcal{F}_\beta(\omega)e^{i\omega\beta^{-1}exp(\beta t)}$ in phase over some cycle. The inverse transform, using the kernel $e^{+i\omega\beta^{-1}exp(\beta t)}$, would reproduce the combination of tones, with distortion only due to the sampling noise, the finite integration time and computational precision. The phase lags $e^{-i\omega'_j r/c}$ denote advancements in component phases at the source while in transit, and their rates of advance, given by the angular frequencies $\omega'_j$, is constant. A similar decomposition at the source should yield $$\int_T \sum_j F_{\beta' j} e^{i\omega'_j \beta'^{-1} exp(\beta' t) + i\phi'_j} e^{-i\omega\beta^{-1} exp(\beta t)} dt \simeq \tag{13}$$

$$\sum_j \int_T F_{\beta' j} e^{i\phi'_j} \delta(\omega'_j e^{\beta' t} - \omega e^{\beta t}) dt.$$

The frequencies continue to evolve during the integration time T, but the local evolutions during T can be ignored if $T \ll C\, r/\beta c$, i.e., if the integration is short, or $r \gg \beta cT$, so that the travel exceeds the integration time. Eq. (13) would represent the receiver's analysis in accordance with all current ideas if the travel delay r/c were to affect only the additive phase $\phi'_j$, so as to yield $$\int_T \sum_j F_{\beta' j} e^{i\omega'_j \beta'^{-1} exp(\beta' t) + i(\phi'_j - \omega'_j r/c)} e^{-i\omega\beta^{-1} exp(\beta t)} dt \simeq$$

$$\sum_j \int_T F_{\beta' j} e^{i(\phi'_j - \omega'_j r/c)} \delta(\omega'_j e^{\beta' t} - \omega e^{\beta t}) dt,$$

describing chirps constructed at the receiver from signals with no time dilation. However, the phase lags $e^{-i\omega'_j r/c}$ cannot be correct as their rates of advancement at source are defined by $\omega'_j$, which are not constant over travel times $r/c \gg T$. The chirp phase lag expression must represent the source frequency variation over the entire travel, but there is no way to add a travel delay r/c to the time t in the delta function in eq. (13) without implying frequency lags.

As d'Alembertian solutions, the chirp components must also retain their frequencies and rates of change all the way from the source. The only possible inclusion of travel delay then yields $$\int_T \sum_j F_{\beta' j} e^{i\omega'_j \beta'^{-1} exp(\beta'[t-r/c]) + i\phi'_j} e^{-i\omega\beta^{-1} exp(\beta t)} dt \simeq \tag{14}$$

$$\sum_j \int_T F_{\beta' j} e^{i\phi'_j} \delta(\omega'_j e^{\beta'[t-r/c]} - \omega e^{\beta t}) dt$$

same as eq. (8) but for involving multiple components, and showing that the same coefficients $F_{\beta' j}$ appear at frequencies offset by the lag factor $e^{-\beta r/c} \approx 1 - \beta r/c$. Polarization is usually represented by separate coefficients $F_{\beta' j}$ for the two transverse coordinate planes at the receiver. An effectively continuous monotonic variation of the plane of polarization should then manifest as a corresponding transfer of amplitudes from one transverse coordinate plane to the other, with corresponding lags.

C-5 Physical Basis of the Inventive Frequency Lags

As shown in standard texts, the electromagnetic wave equations are obtained in terms of the scalar potential $\phi$ (not to be confused with phase) and the vector potential A, from Maxwell's equations describing forces on a test charge or a current (at the receiver) of unit magnitude exerted directly by source charges and currents. In vector form (due to Heaviside), Maxwell's equations are $$\nabla \cdot E = \frac{\rho}{\epsilon_0}, \tag{15}$$

$$\nabla \cdot B = 0,$$

$$\nabla \times E + \frac{\partial B}{\partial t} = 0 \text{ and}$$

$$\nabla \times B - \epsilon_0 \mu_0 \frac{\partial E}{\partial t} = \mu_0 J,$$

where E denotes the electric field intensity; B, the magnetic flux density; $\epsilon_0$, the susceptibility of free space; $\mu_0$, its permeability; and $\rho$ and J, source charge and current, respectively. The potentials become $B = \nabla \times A$ and $\nabla \phi = -E - \partial A / \partial t$, and yield, in the Lorentz gauge $\nabla \cdot A = (\epsilon_0 \mu_0)^{-1} \partial \phi / \partial t$, $$\nabla \cdot E = \nabla \cdot \left( -\nabla \phi - \frac{\partial A}{\partial t} \right) = -\nabla^2 \phi - \frac{\partial}{\partial t} \nabla \cdot A = -\nabla^2 \phi + \epsilon_0 \mu_0 \frac{\partial^2 \phi}{\partial t^2} = \frac{\rho}{\epsilon_0}$$

and $$\nabla \times B - \epsilon_0 \mu_0 \frac{\partial E}{\partial t} = \nabla \times \nabla \times A - \epsilon_0 \mu_0 \frac{\partial}{\partial t} \left( -\nabla \phi - \frac{\partial A}{\partial t} \right) = \mu_0 J.$$

The identity $\nabla \times \nabla \times A = \nabla(\nabla \cdot A) - \nabla^2 A$ then leads to the electromagnetic wave equations $$\nabla^2 \phi - \epsilon_0 \mu_0 \frac{\partial^2 \phi}{\partial t^2} = -\frac{\rho}{\epsilon_0} \text{ and } \nabla^2 A - \epsilon_0 \mu_0 \frac{\partial^2 A}{\partial t^2} = -\mu_0 J, \tag{16}$$

of the same form as the one-dimensional scalar wave equation in Section C-1. The frequency lags in vacuum could be thus attributed to direct interaction with the source distributions $\rho$ and J.

In acoustic interactions, forces on the receiver are delivered by the medium. The inventive chirp travelling wave solutions satisfy the scalar equation for pressure waves, $\nabla^2 p - c^{-2} \partial^2 p / \partial t^2 = 0$, where p is the pressure change [§ I-47-2, Feynman's *Lectures in physics* (Addison, 1969)], as well as the vector wave equation $\mu \nabla \times \nabla \times u - (\lambda + 2\mu) \nabla \nabla \cdot u + \rho \ddot{u} = f$ for an isotropic elastic medium, where $\rho$ and u denote its local density and displacement; $\lambda$ and $\mu$ are the Lame parameters for bulk and shear moduli of elasticity, respectively; and f is a driving function analogous to the electromagnetic source distributions $\rho$ and J. However, the same frequency lags are implied by the travelling wave solutions, so the lags do not inherently depend on direct interaction with wave sources.

The frequency lags more particularly relate to the absence of a physical mechanism in eqs. (15) through (16), connecting the rates of change of source charges and currents, or of source forces and displacements in the acoustic wave equations, to the clock rate at the receiver, since all quantities are local intensities or densities, except the wave speed c, which merely relates the local scales of distance and time. The scale of time kept by the receiver's clock is local. For example, changes in the local gravitational potential should cause it to vary at the rate $\beta = -\dot{\Phi}/c^2 \approx -d/dt(GM_e/r_e c^2) = \dot{r} GM_e/r_e^2 c^2 \equiv g_e \dot{r}/c^2$, along with the contraction of comoving measuring rods, during a fall, where G is the gravitational constant, $M_e$ is the earth's mass, and $g_e \equiv GM_e/r_e^2$ is the gravitational force on ground. Setting this to $H_0$ yields $\dot{r} = H_0 c^2/g_e \approx 0.02$ m s$^{-1}$, as the rate of descent of a telescope to double the observed Hubble shifts, or of its ascent to cancel them out. Jet airliners ascend or descend at close to 1000 m min$^{-1}$ or 15 m s$^{-1}$, so the challenge for a flying telescope like SOFIA would be in maintaining a vertical rate of just 1.2 m min$^{-1}$ for exposures lasting hours.

C-6 Fermat's Principle in the Frequency Domain

The enormous value of the speed of light makes large lags difficult to realize. The cumulative chirp phase of an exponential chirp wave solution over an integration time T would be $$\omega_0 \beta^{-1}[e^{\beta T} - e^{\beta 0}] = \omega_0 \beta^{-1}(1 + \beta T + (\beta T)^2/2! + \ldots - 1) = \omega_0 T + \omega_0 \beta T^2/2 + \ldots . \quad (17)$$

The difference from sinusoidal phase $\omega_0 T$ would be small, on the order of $10^{-25}$ rad over a 5 mm diffraction grating at $\beta = 10^{-18}$ s$^{-1}$ and $5 \times 10^{14}$ Hz, and of $10^{-7}$ rad at $\beta = 1$ s$^{-1}$, as mentioned. To compare, a full cycle of phase difference results if $\omega'_0 e^{-\beta r/c}$ differed from $\omega_0$ by just $(v_0 T)^{-1} \equiv 2\pi/\omega_0 T \sim 10^{-3}$, denoting a typical integration frames of $10^2$ to $10^3$ cycles. The larger difference across frequencies makes the first delta factor in eq. (8) a stronger selector. The second delta factor $\delta(\beta' - \beta)$ appears weak for selecting between components differing only in $\beta$, and also for preferring sinusoids over chirps. It suffices for strong selectivity via a variational argument, as follows.

Existence of chirp components is assured for all fractional rates $\beta$ since lines can be constructed at arbitrary inclinations $\tan^{-1}(\beta) \equiv \angle NEA = \angle CBF$ to the time axis R-R$_T$ (14) at every point F on the receiver frequency axis R-R$_\Omega$ (16) in FIG. 2a. For each fractional rate $\beta' = \beta + \delta\beta$, where $\delta\beta > 0$, the starting angular frequency $\omega'_1$ at time $t_0$ that leads to $\omega_4$ (point E) would be a point A' left of A along the line A-N. If the phase lag going from A to E is $\Delta\phi$, the phase lag going from A' to E would be $\Delta\phi' < \Delta\phi$, since $\omega'_1 < \omega$. For every such point A' a component can be constructed starting at a point A'' to the right of A along A-N, whose phase lag at E would be $\Delta\phi'' = -\Delta\phi$, if A' and A'' are close enough to A to be within the band of frequencies admitted by the receiver.

As their phase lag differences cancel out, each such pair simply adds to the amplitude at $\beta$. This constructive interference, which feeds into and strengthens the spectral selection, assumes that the condition $\beta''^{-1}[e^{\beta''T} - 1] + \beta'^{-1}[e^{\beta'T} - 1] = 0$ can be solved for $\beta''$ for all combinations of real values of $\beta'$ and $\beta$. For small $\delta\beta$, the condition reduces to $(\beta'' - \beta)T^2/2 + (\beta' - \beta)T^2/2 = 0$ from eq. (17), yielding $(\beta'' - \beta) = -(\beta' - \beta)$. The condition would be clearly solvable with higher order terms at larger $\delta\beta$. If A' is so far from A that its phase complement A'' is outside of the admitted frequency band, its contribution would be limited to a few cycles by its increasing frequency difference over the integration. Fermat's principle depends on constructive interference across neighbouring paths at a fixed frequency, instead of neighbouring frequencies over a fixed path considered here. Similar reasoning should hold for a rotating plane of polarization, assuring the corresponding result.

C-7 Application to Time Varying Spectrometry

Diffractive embodiments in the Phase Gradient Patents involve a diffraction grating of width L and integration times T=L sin $\theta$/c, where $\theta$ is the angle of diffraction, as T is the maximum travelled time difference between the interfering wavefronts in the resulting diffraction pattern. Regardless of whether the intervals of the diffraction grating or the refractive index of its surrounding medium are varied, the wave crests and troughs arrive, at each point in the diffraction pattern, at nonconstant intervals, and thereby constitute a chirp waveform. Both schemes are described by the relation $$n\frac{d\lambda}{dt} = \left[\eta \frac{dl}{dt} + l\frac{d\eta}{dt}\right] \sin\theta. \quad (18)$$

where n is the order of diffraction, $\lambda$ is the instantaneous value of the diffracted wavelength, l is the grating interval, and $\eta$ is the refractive index of the medium following the grating. Dividing by the grating equation, $n\lambda = \eta l \sin\theta$, and setting $l^{-1}dl/dt \equiv \beta$ with $d\eta/dt = 0$, or $\eta^{-1}d\eta/dt \equiv \beta$ with $dl/dt = 0$, to describe either approach, or a combination $l^{-1}dl/dt = \gamma\beta$ with $\eta^{-1}d\eta/dt = (1-\gamma)\beta$, where $\gamma \in [0,1)$, would ensure the wavelength at a subsequent detector varies as $\lambda^{-1}d\lambda/dt \equiv \beta$.

At each angle of diffraction $\theta$, the interference comprises N=L/l samples of the waveform from successive slits of the grating, separated in time by delays of $\tau$=l sin $\theta$/c, so the decomposition corresponds to a discrete Fourier transform (DFT) of the waveform function $f(t)$ as $$F(m\omega_\tau) = \sum_{n=0}^{N-1} e^{im\omega_\tau n\tau} f(n\tau), \text{ with the inverse} \quad (19)$$

$$f(n\tau) = \frac{1}{N} \sum_{m=0}^{N-1} e^{-im\omega_\tau n\tau} F(m\omega_\tau),$$

where $\omega_\tau = 2\pi/N\tau$. The corresponding discrete orthogonality condition would be $$\sum_{n=0}^{N-1} e^{im\omega_\tau(n\tau - r/c)} e^{-il\omega_\tau n\tau} \equiv \frac{1 - e^{i(m\omega_\tau - l\omega_\tau)}}{1 - e^{i(m\omega_\tau - l\omega_\tau)/N}} \sum_{n=0}^{N-1} e^{-im\omega_\tau r/c} = \quad (20)$$

$$N\delta_{ml} \sum_{n=0}^{N-1} e^{-im\omega_\tau n r/c},$$

where $\delta_{ml}$ denotes the Kronecker delta, defined as 1 if m=l and as 0 otherwise.

Varying the grating intervals l would cause the sample intervals $\tau$ to vary at the same fractional rate. The result must be identical to varying either the sampling intervals or the angular frequencies $\omega_\tau$ in the transform kernel, in a digital signal processing (DSP) time varying sampling embodiment, also treated in the Phase Gradient Patents. The orthogonality condition, relating to eq. (8), is $$\sum_{n=0}^{N-1} e^{im\omega'_{\tau 0} \beta'^{-1} \exp(\beta'[n\tau - r/c])} e^{-il\omega_{\tau 0} \beta^{-1} \exp(\beta n\tau)} = \quad (21)$$

$$N\delta_{ml} \delta(\omega'_{\tau 0} e^{\beta'[t - r/c]} - \omega_{\tau 0} e^{\beta t}),$$

which holds because the delta function effectively equates frequencies corresponding to the summed phases, and each frequency yields a sum of N terms of unity value when their phases cancel out, but provides at most a cycle otherwise, obviating an intermediate closed form as in eq. (20). The time varying selection replaces the Fourier kernel $e^{-im\omega_1 n\tau}$ with the chirp $e^{-il\omega_0 \beta^{-1} exp(\beta n\tau)}$. The result also shows that the components would be received at shifted frequencies, consistent with the analysis in FIG. 2a indicating angular frequency $\omega_1$ would be received for source frequency $\omega_4$.

Autocorrelation followed by a DFT is preferred in radio astronomy, as used in the Arecibo radio telescope and the Herschel mission, to obtain the power spectrum directly, as $$R(\tau) = \int_T f(t)f^*(t-\tau)\,dt \text{ and } |F(m\omega)|^2 = \sum_{n=0}^{N-1} e^{im\omega t_n} R(t_n), \quad (22)$$

where $R(\tau)$ denotes the autocorrelation. Each Fourier component $Ae^{-i\omega t}$ within the arriving signal contributes $Ae^{-\omega t} \cdot A^* e^{i\omega(t-\tau)} \equiv A^2 e^{i\omega t}$ to the autocorrelation, where $A^*$ is the complex conjugate of the amplitude A, even if f and its component amplitude A are random variates. The second of eqs. (22), known as the Wiener-Khintchine theorem in the theory of random processes, thus always yields the power spectrum. When autocorrelation is applied to sinusoidal waves, the travel delay r/c enters both factors, as $R(t) = \int_T f(t-r/c)f^*(t-\tau-r/c)\,dt$. The contribution of a sinusoidal wave component is then $Ae^{i\omega(t-r/c)}, A^* e^{i\omega(t-\tau-r/c)} \equiv A^2 e^{-i\omega\tau}$, so the travel delay r/c drops out of the power spectrum. Chirp frequency lags might thus seem unavailable via autocorrelation.

However, the corresponding convolution product for a travelling chirp wave would be $$A\exp(i\omega\beta^{-1}e^{\beta[t-r/c]}) \cdot A^*\exp(-i\omega\beta^{-1}e^{\beta[t-\tau-r/c]}) = A^2 \exp(i\omega\beta^{-1}e^{\beta[t-r/c]}[1-e^{-\beta\tau}]), \quad (23)$$

so the frequency lags would indeed survive convolution and shift the power spectrum.

C-8 Application to Modulated Signals

Reception of radio frequency (RF) modulated signals is constrained by receiver integrations to less than the shortest modulation cycle, unlike astronomical observations, particularly at high redshifts, that can be integrated long enough to average out much longer fluctuations. Secondly, most radio receivers are designed to select only the carrier frequencies, and admit side bands bearing modulated information only as a result of the carrier selection, and the carrier itself is reconstructed from side bands in suppressed-carrier systems, as in deep space telemetry, so assurance is needed that the admitted side bands would belong to the selected carrier spectrum even when it comprises chirps.

Most receiver designs involve multiplying and integrating the radio frequency (RF) signal with the output of a local oscillator (LO) for either down-translating to an intermediate frequency (IF), to simplify side band filtering, or demodulation by removing the carrier altogether, as in a Costas loop for carrier recovery in frequency modulation (FM), wherein the error signal itself serves as the demodulated signal. The orthogonality condition for FM reception is then the expectation value $$\int_T \langle \exp[i(\omega_c + \Omega_m)\beta'^{-1}e^{\beta'[t-r/c]}]\exp[-i\omega_o\beta^{-1}e^{\beta t}]\rangle\,dt \simeq \quad (24)$$
$$\delta([\omega_c + \langle\Omega_m\rangle]e^{-\beta' r/c} - \omega_o)\delta(\beta' - \beta),$$

where $\omega_c$ is the nominal carrier angular frequency; $\Omega_m$, a random variable denoting the instantaneous modulation; and $\omega_o$, the reference angular frequency provided by the LO. The condition $\langle \Omega_m \rangle = 0$ is generally required, even in the limit $\beta \to 0$ representing ordinary (Fourier) selection, to guarantee absence of a d.c. (direct current) modulation component, which would convey no information and complicate carrier recovery. Eq. (24) can also represent amplitude modulation (AM) signals, which generally involve multiple side band frequencies, if $\Omega_m$ represents their overall effect. Variation of the reference angular frequency $\omega_o$ should suffice via eq. (24) and the reasoning in Section C-6, for selecting chirp components of the carrier with the applied fractional rate.

Then, if the carrier remains well within the admitted frequency band, and its frequency changes slowly relative to the integration, the only side band components also admitted would be also around the lagging carrier frequency. The condition $\langle \Omega_m \rangle = 0$ cannot hold for side band components that do not belong to the same source emission, so the obtained side band components always belong to the selected carrier. This is the only condition constraining the sinusoidal side bands in current receivers, and should therefore equally suffice to constrain the chirp side bands.

Demodulation in direct conversion can be described by a similar integral relation $$\int_T [(\omega_{c[\tau-r/c]} \pm \Omega_{m[\tau-r/c]}) - \omega_{o[\tau]}]d\tau \approx \int_T \pm \Omega_{m[\tau-r/c]}d\tau, \quad (25)$$

where the square bracket subscripts denote the time parameter, to avoid confusion with time factors. The integral represents an LPF (low pass filter) typically applied after a multiplier to multiply the RF signal, corresponding to the sum of $\omega_c$ and $\Omega_m$, with the LO signal bearing the reference angular frequency $\omega_0$. The LPF suppresses components at the sum of the carrier and reference frequencies, whose combination with those of their difference frequencies would otherwise mathematically keep the signal modulated on the carrier and is thus critical. The integration time T corresponds to the time constant of the LPF, and would be short enough to not average out the modulation.

Eq. (25) describes direct conversion (homodyne) receivers, and this use of multiplication and filtering is known as "mixing". If the LO frequency is varied exponentially, eq. (25) becomes $$\int_T [(\omega_{c[\tau-r/c]} \pm \Omega_{m[\tau-r/c]}) - \omega_{o[\tau]}e^{\beta\tau}]d\tau \approx \int_T \pm \Omega_{m[\tau-r/c]}d\tau.$$

Since the modulation frequency $\Omega_m$ is in general unrelated to the carrier, eq. (9) requires, as in the argument following eq. (9), that $\omega_c$ vary the same way as $\omega_0$. The result is therefore $$\int_T [\omega_{c[\tau-r/c]}]d\tau - \omega_{o[\tau]}\beta^{-1}e^{\beta\tau} \approx 0 \text{ or } \omega_{c[\tau-r/c]} \approx \omega_{o[\tau]}e^{\beta\tau}. \quad (26)$$

Substituting $t = \tau - r/c$ then leads to the frequency condition $$\omega_{c[t]}e^{-\beta r/c} \approx \omega_{c[t]}(1 - \beta r/c) \approx \omega_{o[t]}e^{\beta\tau}, \quad (27)$$

proving the inevitability of frequency lags in direct conversion with a time varying LO.

FIG. 3 illustrates an inventive direct conversion receiver, in which the arriving signal (111) from the antenna (71), bearing instantaneous angular frequency $\omega_d = \omega_c \pm \Omega_m$, as the sum of the carrier and modulation angular frequencies, is multiplied at a multiplier (83) by the output signal of an LO (88), providing the reference angular frequency $\omega_o$. The resulting components of the sum frequencies $\omega_c \pm \Omega_m + \omega_o$ are suppressed by an LPF (75), leaving only the components of difference frequencies $\omega_c \pm \Omega_m - \omega_o$ in the result (128). The principle of direct conversion requires setting $\omega_o = \omega_c$, so that the result signal (128) comprises only the modulation frequency $\Omega_m$, and in effect reconstructs the modulating signal at the source, with time dilation per eq. (1).

The direct conversion principle includes limiting the pass band of the LPF (75) to a modulation bandwidth W/2. By setting $\omega_o = \omega_c$, components of difference frequencies outside of $\omega_c - \omega_o \pm W/2$ at the output of the multiplier (83), due to components outside of $\omega_c \pm W/2$ in the Fourier spectrum of the arriving signal (111), would be effectively eliminated in the output (128) of the LPF (75). The antenna (71) is usually designed to receive over a wide range of wavelengths, so an RF tuner (98) would be included in the antenna path as shown. The variation of the angular frequency $\omega_o$ of the LO (88) needed for a nonzero β in eq. (24) can be realized using a voltage controlled oscillator (VCO) as the LO (88), and applying a ramp or sawtooth signal v(t) (121) to the frequency control input of the VCO, as indicated in the figure.

Heterodyne receivers involve one or more IF stages. The carrier down-translation and filtering at each stage, other than the last, provides the next stage IF carrier and modulation frequencies. Denoting the carrier RF and the IFs by the sequence $\{\omega_0, \omega_1, \ldots, \omega_n\}$, where $\omega_0 \equiv \omega_c$ is the original (RF) carrier, and $\omega_n = 0$ signifies the last stage, the LO reference angular frequencies at each stage would be $\omega_o^{(j)} = \omega_{j-1} - \omega_j$, for $j = 1 \ldots n$. Exponential variation of the LO frequencies yields $$\int_T (\omega_{c[\tau-r/c]} \pm \Omega_{m[\tau-r/c]}) d\tau - \omega_{o[\tau]}^{(1)} \frac{e^{\beta_1 \tau}}{\beta_1} \approx \int_{T_1} (\omega_{1[\tau]} \pm \Omega_{m[\tau-r/c]}) d\tau, \quad (28)$$

and $$\int_{T_j} (\omega_{j-1[\tau]} \pm \Omega_{m[\tau-r/c]}) d\tau - \omega_{o[\tau]}^{(j)} \frac{e^{\beta_j \tau}}{\beta_j} \approx \int_{T_j} (\omega_{j[\tau]} \pm \Omega_{m[\tau-r/c]}) d\tau,$$

for $j=2 \ldots n$, in which the integration time $T_j$ is the jth stage filter time constant, and the LO frequencies refer to current time τ at the receiver, and not a retarded time (τ−r/c). By L'Hôpital's rule, the cumulative phase factors $\beta_j^{-1} e^{\beta_j \tau}$ reduce to unity in the limit $\beta_j \to 0$ describing current systems. The independence of $\Omega_m$ allows dropping it altogether in eqs. (28), yielding $$\omega_{c[\tau-r/c]} - \omega_{o[\tau]}^{(1)} e^{\beta_1 \tau} \approx \omega_{1[\tau]} \text{ and } \omega_{j-1[\tau]} - \omega_{o[\tau]}^{(j)} e^{\beta_j \tau} \approx \omega_{j[\tau]}$$
for $j = 2 \ldots n$. \quad (29)

The main difference from the homodyne constraint, eq. (26), is that the form of the selected IF or RF carrier component supplying $\omega_{j-1}$ is undetermined until the last stage. Eqs. (29) lead to $$\omega_{c[\tau]} e^{\beta(t-r/c)} \approx \omega_{c[\tau]} e^{\beta t} (1 - \beta r/c) \approx \omega_{o[\tau]}^{(1)} e^{\beta_1 t} + \ldots + \omega_{o[\tau]}^{(n)} e^{\beta_n t}, \quad (30)$$

corresponding to eq. (27). The carrier frequency lag then corresponds to an effective β given by $$e^{\beta(t-r/c)} \approx \frac{\omega_o^{(1)}}{\omega_c} e^{\beta_1 t} + \ldots + \frac{\omega_o^{(n)}}{\omega_c} e^{\beta_n t} \text{ or} \quad (31)$$

$$\beta \approx \frac{\omega_o^{(1)}}{\omega_c} \beta_1 + \ldots + \frac{\omega_o^{(n)}}{\omega_c} \beta_n$$

to a first order, where the IF ratios $\omega_o^{(j)}/\omega_c$ may need adjustment to support practical fractional rates $\beta_j$. All of the LOs can participate in determining the carrier β this way because the processing is phase-coherent all the way to the demodulation. As the desired value of β can be obtained by varying a single LO, the result allows a choice of which LOs to vary, and to make the best use of the range, speed and precision of variations provided by the component technologies.

FIG. 4 illustrates an inventive heterodyne receiver, in which the signal (111) from antenna (71), of instantaneous angular frequency $\omega_d = \omega_c \pm \Omega_m$, is multiplied at a first stage multiplier (84) by the output of a first stage LO (89) providing a reference angular frequency $\omega_o^{(1)}$ and then filtered at a first stage band-pass filter (BPF) (93), to suppress components of the sum frequencies $\omega_c \pm \Omega_m + \omega_o^{(1)}$, as well as those of difference frequencies $\omega'_c \pm \Omega_m - \omega_o^{(1)}$ from other carrier frequencies $\omega'_c$, that would otherwise cause interference. The BPF output (129) is then the IF signal of instantaneous frequency $\omega_c \pm \Omega_m - \omega_o^{(1)} = \omega_1 \pm \Omega_m$, where $\omega_1$ is typically below the original carrier $\omega_c$.

This IF signal then passes through zero or more further IF stages, each comprising a multiplier (85), an LO (90) providing reference angular frequency $\omega_o^{(j)}$, and a BPF (94) to produce a modulated IF signal of a still lower angular frequency $\omega_j \pm \Omega_m$ as its output (130). The last stage includes a final multiplier (86) that multiplies the IF signal from the preceding stage, of angular frequency $\omega_{n-1} \pm \Omega_m$, with the output of the final LO (91) of angular frequency $\omega_o^{(n)}$, and is followed by a final LPF (75), whose output (128) has only the modulation term $\Omega_m$. The heterodyne design allows setting the LOs in one or more stages to above the IF carrier at each stage. The BPFs allow better rejection of adjacent carriers than direct conversion, as well as "crystal radios", which comprise only RF tuning and envelope detection. An RF tuner (98) is also ordinarily needed to suppress the mirror carriers $\omega_c \mp \omega_o^{(1)}$ that would yield the same IF and thus pass through the BPFs.

The required varying of one or more of the LO frequencies $\omega_o^{(j)} (j=1 \ldots n)$ may be achieved again using ramp or sawtooth signals $v_j(t)$, as frequency control input (122) to the first LO (89), the frequency control input (123) to an intermediate stage LO (90), or the frequency control input (124) to the last LO (91), respectively, as shown. The last stage may terminate in an envelope detector for AM reception, or be replaced by a phase locked loop (PLL), Foster-Seely, quadrature or ratio detector in the case of FM, and so on, as would be apparent to those skilled in the related arts. When using a PLL with a VCO for FM demodulation, the VCO would be locked to the IF output of the preceding stage, and the loop frequency error signal is the demodulated output, as in Costas receivers. This VCO could be also varied to contribute to the overall β, per eq. (31).

The LOs would generally need to be electrically varied in general to achieve the fractional rates β needed in most applications, as calculated in the Phase Gradient Patents and the SPIE paper. The electrical variation range of variable capacitors, known as varicaps and varactors, though typically less than 100 pF, would be adequate at higher frequencies. However, the tuning speed gets limited by residual inductances, and simultaneous variation of multiple LOs poses problems of control.

FIG. 5 illustrates one way how multiple LO frequencies and their variation can be achieved with "mixing" to keep the control simple. The figure shows the output of a single control LO (99), varied by a single control signal $\epsilon(t)$ (125) at instantaneous rate $\dot{\omega}_0 \equiv \beta_o \omega_o$, that supplies the time-varying LO frequencies for $\omega_o^{(j)}(t)$, j=1 . . . n, needed in FIG. 4, with the help of frequency multiplier or divider means (100), (101) and (102), to construct varying frequency differences $\delta\omega^{(1)}(t)$, $\delta\omega^{(j)}(t)$ and $\delta\omega^{(n)}(t)$ that are multiplied by fixed LO frequencies $\omega_{oo}^{(1)}$, $\omega_{oo}^{(j)}$ and $\omega_{oo}^{(n)}$, generated by LOs (89), (90) and (91), respectively, at multipliers (103), (104) and (105), at the first, jth, and last stage, respectively, as shown. The band-pass filters (95), (96) and (97) reject the difference frequencies $\omega_{oo}^{(1)} - \delta\omega_{oo}^{(1)}(t)$, $\omega_{oo}^{(j)} - \delta\omega^{(j)}(t)$ and $\omega_{oo}^{(n)} - \delta\omega^{(n)}(t)$, producing the sum frequencies $\omega_{oo}^{(1)} + \delta\omega^{(1)}(t)$, $\omega_{oo}^{(j)} + \delta\omega^{(j)}(t)$ and $\omega_{oo}^{(n)} + \delta\omega^{(n)}(t)$, with the effective instantaneous fractional rates $$\beta_j \equiv \omega_{o0}^{(j)-1} \frac{d}{dt}[\delta\omega^{(j)}(t)] = \rho_j \dot{\omega}_o / \omega_{o0}^{(j)} = \rho_j \beta_o \omega_o / \omega_{o0}^{(j)}, \quad (32)$$

for $j = 1 \ldots n$, where $\rho j = \delta\omega^{(j)}/\omega_o$ is the net multiplication factor from the LO (99) to the jth multiplier (104).

The scheme enables uniform variation of multiple LO frequencies using a single frequency control signal (125). The frequency multiplier or divider means (100), (101) and (102) would likely contribute phase noise, but similar phase noise is also likely with the independently varied LOs of FIG. 4. The band-pass filters (95), (96) and (97) are not critical, since with a judicious choice of the IFs and the sum frequencies $\omega_{oo}^{(1)} + \delta\omega^{(1)}(t)$, $\omega_{oo}^{(j)} + \delta\omega^{(j)}(t)$ and $\omega_{oo}^{(n)} + \delta\omega^{(n)}(t)$, BPFs (93) and (94), and the LPF (75) present in the receiver of FIG. 4 could be also used to eliminate the difference frequencies $\omega_{oo}^{(1)} - \delta\omega^{(1)}(t)$, $\omega_{oo}^{(j)} - \delta\omega^{(j)}(t)$ and $\omega_{oo}^{(n)} - \delta\omega^{(n)}(t)$. FIG. 6 illustrates the simplification. The multipliers (103), (104) and (105) are retained because analogue multipliers typically allow only two inputs. The receiver could alternatively designed to utilize the difference frequencies $\omega_{oo}^{(j)} - \delta\omega^{(j)}(t)$, by instead rejecting the sum frequencies $\omega_{oo}^{(j)} + \delta\omega^{(j)}(t)$ at the filters.

Two further variations could offer substantial advantages, in terms of component availabilities, operational stability and other practical considerations. First, the control LO (99) could be designed to operate at close to the lowest LO frequency $\omega_{oo}^{(n)}$, i.e., from the right-most LO (91) in FIG. 6, with the frequency multiplier or divider means (100), (101) and (102) connected in reverse to up-convert the output of the control LO (99) to the multipliers (103), (104) and (105), going from right to left, as shown in FIG. 7. This allows operating at very high RF at which direct control of varicaps become impractical due to leakage reactances. The second variation concerns choosing $\rho j = \omega_{oo}^{(j)}/\omega_o$ in the receiver of FIG. 6, so that all of the achieved fractional rates as well as the effective $\beta$ (eq. 31) become equal to $\beta_o$, and in feeding the outputs of the frequency multiplier or divider means (100), (101) and (102) directly to the multipliers (84), (85) and (85), respectively. The LOs (89), (90) and (91), and multipliers (100), (101) and (102) are eliminated, reducing the total number of parts.

Eqs. (25-32) govern all such analogue radio receivers using one or more LOs, as well as digital receivers in which the down-translation and filtering are performed digitally. Only for crystal radio receivers, which use envelope detection and a single RF tuning stage for carrier selection, varying the RF tuning, as described in U.S. Pat. No. 7,180,580, is the only means for chirp carrier selection.

The phase lock condition applicable to phase locked loops (PLL) used for carrier recovery, and also for demodulation of FM signals, as in Costas loop designs, is fundamentally given by $$\epsilon(t) = \int_{T'} [(\omega_c - \omega_o)\tau + \Phi_c + \Phi_m - \Phi_o] d\tau \approx 0, \quad (33)$$

where $\epsilon(t)$ is the phase error signal generated by a phase comparator in the loop; $\omega_0$ is the angular frequency of the VCO used in the loop; T' is the time constant of an LPF that invariably follows the phase comparator; $\Phi_m$ is the instantaneous phase deviation due to the modulation; and $\Phi_c$ and $\Phi_o$ denote carrier and VCO phase noises, respectively. The phase noise and the modulation phase terms qualify as random variables uniformly distributed over [0, 2π), since T' is generally set much longer than the longest modulation component cycle in order to ensure carrier recovery. The error signal $\epsilon(t)$ then locks the VCO to the carrier phase to within a cycle, hence barring occasional cycle slips, the VCO frequency $\omega_0$ should track the arriving carrier through all frequency variations.

However, all known treatments of PLLs interpret the carrier frequency as ordinarily constant, and its variations as merely shifts of the Fourier spectrum. The possibility of identical phase lock to a nonsinusoidal spectrum of the carrier has never been considered, so the usual assumption that the result would be at most a changing sinusoidal behaviour cannot be correct. Since the object of carrier recovery is to suppress modulation as well as phase noise, its success signifies the stronger condition $\int_{T'}[\Phi_c - \Phi_o + \Phi_m] d\tau \approx 0$, i.e., $\int_{T'}(\omega_c - \omega_o)\tau d\tau \approx 0$, with T'>>T, where T denotes the integration time as in eqs. (25-31). This does not require constancy of $\omega_c$ or $\omega_o$. Further, $\omega_c$ and $\omega_o$ denote peak or close to peak frequencies in the carrier and VCO spectra, respectively, and the LPF acts only on the phase error signal, so the input and VCO spectra are also not constrained.

The loop constraint with phase differences computed individually at each frequency would be $$\int_{T'} \sum_j F'_{\beta' j}[\omega'_j \beta'^{-1} \exp(\beta'[t - r/c]) + \phi'_j - \omega_o]\tau d\tau \approx 0, \quad (34)$$

where $F'_{\beta' j}$ are weights relating to the coefficients $F_{\beta' j}$ of the carrier chirp spectrum for an arbitrary fractional rate $\beta'$, from Section C-4. A similar spectral expression for $\omega_o$ is not appropriate because $\omega_o$ represents the angular frequency set by the receiver in order to select from the carrier spectrum.

Eq. (34) covers the steady-state scenario of stationary carrier and phase-locked VCO frequencies at $\beta'=0$, and is thus more general than an expression involving only the carrier's Fourier spectrum. It is not the only possible representation, as the precise function of the phase differences minimized depends on the PLL design—as the time factor τ is linear, any polynomial expression of the phase differences could be minimized to achieve the lock. The lock of itself means that $\omega_0$ tracks variations of the carrier spectrum and is not inherently constant. Eq. (34) thus resembles eq. (9) in requiring that the VCO and the carrier spectrum vary similarly. However, since the VCO is needed to track the carrier frequency, it is not obvious that it can be independently varied like the LO of FIG. 3 to force an analogous phase lock over the chirp spectrum of the carrier.

FIG. 8 illustrates a PLL with two possible modifications to modulate the VCO while maintaining phase lock. The PLL comprises a phase comparator (72), a first low-pass filter (LPF) (76), the VCO (73), and a feedback circuit (74) feeding the output signal (119) of the VCO (73) back into the phase comparator (72) for comparing with a modulated input signal (115). The first LPF (76) suppresses high frequency variations and phase noise in the output of the phase comparator (72), to produce the frequency error signal $\epsilon(t)$ (114) at the frequency control input of the VCO (73).

The first mechanism included for modulating the VCO comprises a summing device (87) to add a first control signal $\upsilon(t)$ (126) to the error signal $\epsilon(t)$ (114) to change the input (116) to VCO (73) to $\epsilon'(t) \equiv \epsilon(t)+\upsilon(t)$. If this first control signal $\upsilon(t)$ (126) is a ramp or sawtooth waveform, the VCO output (119) should drift as $\omega'_o(t)=\omega_o+K\epsilon'(t)=\omega_o+K[\epsilon(t)+\upsilon(t)]$, in which the coefficient K is determined by the PLL design. The second mechanism comprises a multiplier (82) multiplying the VCO output (119) by a second control signal v'(t) (127), followed by a second LPF (79), needed to suppress either the sum or the difference frequency component in the output of the multiplier (82), and to thereby modify the feedback signal (118) input to the comparator (72). Again using a ramp or a sawtooth frequency modulated signal as the second control signal v'(t), the result would be a drift $\omega'_o(t)=\omega_o+\omega'(t)$, where $\omega'(t)$ is the (angular) frequency of the second control signal v'(t). With either or both mechanisms, i.e., $\upsilon(t) \neq 0$ or v'(t) varying, the phase lock condition becomes $$\int_{T'} \sum_j F'_{\beta' j} [\omega'_j \beta'^{-1} \exp(\beta'[t-r/c]) + \phi'_j - \omega_o \beta^{-1} \exp(\beta t)] \tau d\tau \approx 0, \quad (35)$$

where the reference frequency term $\omega_o \beta^{-1} \exp(\beta t)$ denotes the drifting VCO angular frequency, and implies that the phase lock can indeed only occur at the applied rate $\beta$, consistent with eq. (27).

The difference is that eq. (35) concerns signal differences rather than products as in eq. (8), so the pairs of neighbouring fractional rates $\beta \pm \delta\beta$ in the Fermat's principle reasoning of Section C-6, should cancel each other, instead of adding constructively at the fractional rate $\beta$, and thus imply an overall amplitude of zero measure, occurring only at $\beta$, as the net result. This unphysical result simply means that the ideal phase comparator assumed in eq. (34) does not exist.

Real PLLs typically use a multiplier as the phase comparator element (72), and the subsequent LPF (76) suppresses the sum frequency components; the distinction from "mixing" in the homodyne and heterodyne receivers of FIGS. 3-7 is that as the frequency difference in lock would be extremely small, the LPF would be set to reject as little as 1 Hz even at a 20 MHz IF, as notably done in the DSN according to the DSN Handbook. The underlying physics therefore still involves constructive interference over a differential neighbourhood of $\beta$, and conforms to the reasoning in Section C-6.

C-9 Other Practical Considerations

It would be apparent to those skilled in the related arts that variation of variable tuning elements, of the coefficients of convolution filters, and of the kernel in the digital spectral transform of Section C-7 could be combined with the variation of LOs for realizing the inventive chirp components.

In particular, convolution filters with time varied coefficients would in effect directly extract the dilated (or compressed) waveforms corresponding to the inventive chirp components with lags. It would be further apparent that these techniques can be easily combined with, or incorporated in, orthogonal frequency division multiplexing (OFDM), ultra-wideband (UWB), frequency hopping, and other such advanced schemes, or combined with digital processing, as in software defined radio (SDR). Varying of LOs would be also applicable to optical communication using lasers as LOs and optical "mixing" for phase-coherent down-translation or demodulation.

In narrow band applications like radar, linear chirps may be used instead of the exponential form to exploit known methods to keep the absolute rate $\dot{\omega}$ steady. Though the fractional shifts then vary with time, the actual shifts, i.e., the lags, would be constant over fixed round trip distances r, as $\delta\omega=\dot{\omega}r/c$, as in CW-FM radar theory. The advantages remain that the inventive shifts increase with r indefinitely beyond the transmitter's frequency range, and would not be limited to echoes.

The Phase Gradient and Multiplexing Patents allow for a possibility that the inventive spectral selection or decomposition could be repeatedly applied to the same signal or waves so as to multiply, or negate, the inventive spectral shifts. The inventive selection or decomposition was denoted by an operator $H(\beta)$, so that successive applications could be described by a product law $H(\beta_1)H(\beta_2)=H(\beta_1+\beta_2)$, with the inverse $H^{-1}(\beta) \equiv H(-\beta)$. Source separation was then succinctly described by the product $H^{-1}GH$ having the form of a projection operator, where G denoted a filter admitting the shifted frequency band. However, eq. (8) implies $H(\beta)H(\beta')=H(\beta)\delta(\beta-\beta')$, so the inverse only exists at $\beta=0$. The function of $H^{-1}$, translating the output of filter G back to the original frequency band, is digitally trivial, however, and can be conceivably achieved in analogue receivers by other means including "mixing", as mentioned in the Multiplexing Patent.

Multiplication of the shifts across receivers is permitted with retransmission. A signal at angular frequency $\omega_1=\omega_0(1-\beta_1 r_1/c)$ from a source at distance $r_1$ emitting instantaneously at an angular frequency $\omega_0$ with fractional rate $\beta_1$ received by a first receiver, upon retransmission, at the (shifted) received frequency, can be received at an additional distance $r_2$ at a different fractional rate $\beta_2$ at angular frequency $\omega_2=\omega_1(1-\beta_2 r_2/c)=\omega_0(1-\beta_2 r_2/c)(1-\beta_1 r_1/c)$, since there is nothing to stop a receiver from retransmitting. This notion is better expressed by incorporating the distances into the operator notation, as $\omega_2=H(\beta_2,r_2)H(\beta_1,r_1)\omega_0$. A receiver having an extended internal path length $r_2$ could incorporate both operators, and set $\beta_2=-\beta_1 r_1/r_2$, in order to realize $H^{-1}(\beta_1,r_1)$ as $H(-\beta_1 r_1/r_2, r_2)$ for the source separation. The retransmission itself could also occur at a different frequency than received, including passively as in fluorescence.

The orthogonality between fractional rates, by eq. (8), incidentally also means that the existence of travelling chirp wave solutions cannot be verified by simulation, as the only spectral components detected would be those specifically constructed in the simulation.

Fast Fourier transforms (FFT) with close to O(N log N) performance on nonequispaced data are now available [D Potts, G Steidl and M Tasche, "Fast Fourier transforms for nonequispaced data: A tutorial", *Modern Sampling Theory: Math, and Appl.*, Birkhauser (2001); J Keiner, S Kunis and D Potts, "Using NFFT3—a software library for various nonequispaced fast Fourier transforms", ACM Trans Math, Software, 36, pages 1-30 (2009)]. These permit time-varied phase factors in FFT over uniform sample data streams, equivalent to refractive index variation in eq. (18), as described in the second of the Phase Gradient Patents, as another practical route to the invention in digital receivers, especially those using integrated RF tuners that disallow continuous variation.

D. Applications of the Distance Information

Orthogonality of the lags in the inventive travelling wave solutions to source information, including modulated or encoded information, is best illustrated by application to source distance-based separation of signals arriving simultaneously or bearing the same encoding, so they occupy the same channels in time domain multiplexing (TDM) or code division multiplexing (CDM), respectively.

The scheme exploits the similarity of the inclination of chirp lines J-D (63) and I-E (62) to an angle of view, $\tan^{-1}(\beta) = \angle DAE \equiv \angle NEA$, of source frequencies at D and E, respectively, by combining it with the inclination $\angle DAC = \tan^{-1}(|DC|/|AD|) = \tan^{-1}(r/\Delta t) \equiv \tan^{-1}(c)$ of the travel lines like A-C (51) to obtain an angle of view $\angle ECD = \tan^{-1}(|DE|/|DC|) = \tan^{-1}(\Delta\omega/r) \equiv \tan^{-1}(\beta/c)$ across space, denoting a frequency domain analogue of parallax, as illustrated in FIG. 9a reproduced from the Multiplexing Patent. In the figure, receiver R (181) must distinguish signals from two transmitters $S_1$ (182) and $S_2$ (183) at distances r' and r", respectively, transmitting over the same (angular) frequency band of width W, includes suitable guard bands, and the same carrier frequency $\omega_c$, so they would not be separable by frequency domain techniques.

The scheme was formalized in the Multiplexing Patent in terms of a linear operator $H(\beta)$, which, when applied to the received combined signal spectrum $F'(\omega)+F''(\omega)$, yields $H(\beta)F(\omega) = H(\beta)F'(\omega) + H(\beta)F''(\omega)$, where $H(\beta)F'(\omega)$ and $H(\beta)F''(\omega)$ would be found shifted in proportion to their respective source distances r' and r", as shown. The figure shows that the bandwidths of the shifted spectra would be proportionally scaled as well, so the shifts more truly represent scaling of frequencies, consistent with a reverse scaling of the receiver clock rate (see Section C-5). The Multiplexing Patent includes a subband strategy to address signals of large bandwidth or sources close in range, in which cases, the scaled spectra would otherwise still overlap.

The net result is a separation of the signal spectra along the frequency axis (16) at the receiver, so that either signal can be then selected using a band-pass filter whose passband covers the scaled desired frequency band HF' or HF", respectively. The filtered products $G'HF' \equiv G'(\omega)H(\beta)F'(\omega)$ and $G''HF'' \equiv G''(\omega)H(\beta)F''(\omega)$ would be separate, but shifted and magnified, so a reverse scaling operation $H^{-1}(\beta) \equiv H(-\beta)$ is necessary to complete the recovery of the desired source signal. The overall process is thus an operator product $H^{-1}GH$, where $G=G'$ or $G''$, in the form of a projection operation in the frequency-distance domain, although the $H^{-1}$ operation must be realized by other means, as remarked in Section C-9. An asymptotic rule derived in the SPIE paper, $$\frac{\delta r}{r} \simeq \frac{2W}{f_c - W} \approx \frac{2W}{f_c}, \quad (36)$$

where $f_c \equiv \omega_c/2\pi$ denotes the centre frequency, also holds for the present invention.

The Multiplexing Patent proposed a pre-filter S around $\omega_c$ to avoid interference from any Fourier components arriving in the pass-bands of filters G' or G", as the Fourier components would be also admitted by these filters, but all Fourier components would be eliminated by the orthogonality of the inventive chirp components to sinusoids in the spectral decomposition or selection process. The only additional possibility of interference is from chirp components from unwanted sources bearing the same fractional rates which would not eliminated by the spectral decomposition or selection.

FIG. 9b illustrates this additional problem of "chirp mode interference", depicted by the shaded inclined region (142), showing that signals at carrier angular frequency $\omega_c$ from the first transmitter $S_1$ (182) and at $\omega'_c < \omega_c$ from the second transmitter $S_2$ (183) would both arrive in the pass-band of filter G' at receiver R (181) at the receiver's applied fractional rate $\beta$. These signals ordinarily do not interfere, as their Fourier interference regions (143) and (144) do not overlap. This chirp mode interference would not be an issue in deep space telemetry, but would affect terrestrial applications due to the multiplicity of sources on earth. The pre-filter in the Multiplexing Patent would block the Fourier interference region (141), which is already rejected by the selection of chirp components represented by the inclined region (142), however. The Fourier interference regions (143) and (144), corresponding to signals that interfere only in the chirp mode represented by inclined region (142), are non-interfering, and thus present a way around chirp mode interference, just as the chirp mode presents a way around the interference of Fourier spectra, according to FIG. 9a.

If the receiver R (181) correlates chirp mode information arriving through filter G' with Fourier information arriving through filter G, the correlated signal would be the signal of the first transmitter $S_1$ (182) emitted at carrier angular frequency $\omega_c$, since the interference in the chirp mode from the second transmitter (183) would be a signal transmitted at carrier angular frequency $\omega'_c$, which would be generally unrelated to, and therefore not correlate with, the Fourier mode interference from the second transmitter $S_2$ (183) or any other transmitter, emitted at carrier angular frequency $\omega_c$. Any chirp mode components starting at angular frequency $\omega_c$ at the second transmitter $S_2$ (183) would arrive at frequencies beyond the pass-band of filter G' and thus not enter the correlation. Likewise, any Fourier mode interference at carrier angular frequency $\omega'_c$ from the first transmitter $S_1$ (182) would arrive in the pass-band of filter G", and not of filter G, and would be thus excluded.

Conversely, receiver R (181) could correlate the chirp mode information arriving through filter G' with the Fourier information arriving via filter G", to obtain the signal of the second transmitter $S_2$ (183) emitted at carrier angular frequency $\omega'_c$, free of both chirp and Fourier mode interference from the first transmitter $S_1$ (182), as the latter's chirp mode interference would have been emitted at carrier angular frequency $\omega_c$, and its Fourier interference, at carrier angular frequency $\omega'_c$. To jam a signal of carrier angular frequency $\omega'_c$ by the second transmitter $S_2$ (183) from receiver R (181), the first transmitter $S_1$ (182) must transmit its jamming signal not only at the carrier angular frequency $\omega'_c$ of the second transmitter $S_2$ (183) but also at $\omega_c = \omega'_c(1-\beta r'')/(1-\beta r')$, in order to also jam chirp mode reception of the second transmitter $S_2$'s signal in the pass-band of filter G'.

Since $\beta$ is chosen, and can be varied arbitrarily, by receiver R (181), there is no way the first transmitter $S_1$ (182)

could anticipate and jam all chirp mode reception. The correlation raises the challenge for jamming, as the first transmitter $S_1$ (182) must emit the same jamming signal at both $\omega_c$ and $\omega'_c$ in order to defeat correlation, and the value of $\omega_c$ depends on the receiver's choice of $\beta$.

Denoting the time domain signal f(t) reconstructed from the Fourier components admitted by filter G" as $f(t)=f^{(2)}(t)+f^{(1)}(t)$, where $f^{(2)}$ is the signal of the second transmitter $S_2$ (183) and $f^{(1)}$ is the interference from the first transmitter $S_1$ (182); and the time domain signal reconstructed from the chirp spectrum admitted by filter G', after correcting for frequency shift and time dilation, as $f_\beta(t)=f_\beta^{(2)}(t)+f_\beta^{(1)}(t)$, where $f_\beta^{(1)}$ again denotes the interference from transmitter $S_1$ (182); the expectation value of their product would be $$\langle f(t)f_\beta(t) \rangle = \langle [f^{(2)}+f^{(1)}][f_\beta^{(2)}+f_\beta^{(1)}] \rangle = \langle f^{(2)}(t)$$
$$f_\beta^{(2)}(t) \rangle = \langle |f^{(2)}(t)|^2 \rangle, \quad (37)$$

because equality of Fourier and chirp coefficients is assured if and only if they belong to the same transmission, hence only for coefficients $F^{(2)}(\omega)$ and $F_\beta^{(2)}(\omega)$ from transmitter $S_2$ (183). The result corresponds to the square of the amplitude of the original signal as the reconstructions $f^{(2)}(t)$ and $f_\beta^{(2)}(t)$ would be each independently identical to this original signal from transmitter $S_2$ (183). The similar term $\langle f^{(1)}(t) f_\beta^{(1)}(t) \rangle$ for the first transmitter $S_1$ (182) must vanish as the factors belong to generally different signals originating at $\omega'_c$ and $\omega_c$ from the first transmitter $S_1$'s location. The cross terms $\langle f^{(1)}(t)f_\beta^{(2)}(t) \rangle$ and $\langle f^{(2)}(t)f_\beta^{(1)}(t) \rangle$ vanish as the factors come from different transmitters. The time domain multiplications correspond to phase correlations in the frequency domain. The result can be clearly improved by extending to m signals and different fractional rates, as $$\langle f(t)f_{\beta_1}(t) \ldots f_{\beta_m}(t) \rangle = \langle f^{(2)}(t)f_{\beta_1}^{(2)}(t) \ldots$$
$$f_{\beta_m}^{(2)} \rangle = \langle |f^{(2)}(t)|^m \rangle. \quad (38)$$

E. Applications of the Wavelength Transformation

A fundamental significance of the signal separation scheme above is it allows reuse of the bandwidth W around the angular frequency $\omega_c$ by indefinitely many transmitters, and in effect thus multiplies the channel capacity indefinitely, though the channel capacity realized between the receiver R (181) and each of transmitters $S_1$ (182) and $S_2$ (183) remains equal to the signal bandwidth W. Capacity multiplication over point-to-point links like optical fibre, coaxial cable, and microwave, would have much wider applicability, from transmission lines in integrated circuits to large cable networks.

FIG. 10a illustrates how capacity multiplication can be obtained between a receiver R (181) and a source S (184) with a link (191) of optical length r and having a narrow transmission band around a specific wavelength $\lambda_1$. Multiple signals are shown entering one end A of the link (191) close to the source S (184) and leaving the other end B near the receiver R (181).

The wavelength axis (17) is drawn at the source S (184), with arrows to explain that signals emitted by the source (184) at diverse wavelengths $\lambda_0, \lambda_1, \lambda_2, \ldots$ can be coupled into and transmitted via the link (191) by applying different corresponding fractional rates $\beta_0, \beta_1, \beta_2, \ldots$, respectively, at the receiver R (181), as marked on the fractional rate axis (18). Over the given path length r, the signals arrive at the receiver R (181) at lagging wavelengths $\lambda_j[1+\beta_j r/c+o(\beta_j)]$, for j=0, 1, 2 . . . , hence by setting $\beta_j \approx (\lambda_1/\lambda_j - 1) c/r$, these arriving wavelengths can each be made $\lambda_1$, which is transmitted by the link (191). The result depends only on the total effective path length r and not on the specifics of the physical channels or media along the path, and exploits the d'Alembertian character of the inventive travelling wave solutions not anticipated in the prior patents.

The receiver R (181) would be then able to receive data from the source (184) at as many times the capacity of the link (191) as the number of fractional rates $\beta_j$ simultaneously implemented at the receiver R (181), provided the source (184) can transmit at each of the wavelengths $\lambda_j$. The only limit on the channel capacity is the totality of chirp mode signals that could be accommodated with adequate noise margin in the linear range of the physical media comprising the link, in which the electric field or acoustic displacements would be a superposition of the concurrent signals.

These ideas clearly also enable receiving signals emitted at the wavelengths $\lambda_1, \lambda_2 \ldots$ through a restrictive channel, such as a narrow aperture or a long tunnel or waveguide, that ordinarily blocks these wavelengths, but would admit wavelength $\lambda_0$. Such a receiver could be further coupled with a transmitter to re-transmit the received signals, to serve as a repeater, and combined with additional similarly multiplexed hops, following the retransmission considerations in Section C-9.

FIG. 10b illustrates a converse application of the d'Alembertian behaviour that all transmission, absorption, scattering and diffraction behaviour over the entire path from the source must conform to the lagging wavelengths seen by the receiver. The link (191) of FIG. 10a could be then replaced by an object or test material (192) and the source S (184) needs to radiate only a narrow spectrum around wavelength $\lambda_1$, in order to enable measurement or imaging of the transmission, absorption, scattering or diffraction characteristics of the object or test material (192) to the receiver R (181), at arbitrary wavelengths $\lambda_j$ using corresponding fractional rates $\beta_j$, as in FIG. 10a. This supports and refines the capabilities envisaged in the Frequency Generation Patent.

In retrospect, all physical channels have been assumed to have finite capacities in communication theory, as in C E Shannon's "A Mathematical Theory of Communication" [*Bell Sys Tech J*, 27:379-423, 623-656, 1948], due to the assumption that only sinusoidal travelling wave solutions exist, which dates back not just to Fourier's treatment of the heat equation ca. 1807 closely following Fresnel's treatment of diffraction ca. 1805, but further back to the "vibrating string controversy" involving Euler and others regarding d'Alembert's solutions, whose generality was thus, in hindsight, occluded by concerns of continuity, eventually addressed by the Dirichlet conditions without allowing for time dilations, as remarked, and of standing wave modes of vibration, rather than travelling waves.

FIG. 10a establishes that current notions of limits on communication, including signal isolation and transmission capacity in space or over a medium, cannot be fundamental. Shannon's theorem $C=W \log_2(1+S/N)$ relating physical channel capacity C to the bandwidth W and signal-to-noise ratio S/N, and related considerations of time-bandwidth products, would still govern each selection or decomposition process providing a chirp or Fourier mode input in eqs. (38)-(38), and each index j in FIGS. 10a and 10b. The multiplexing and capacity multiplication capabilities result from the multiplicity of chirp modes, which complement spatial modes in waveguides and optical fibres. The decoupling of the wavelengths of observation or imaging from those of illumination, in FIG. 10b, concerns a similar complementarity to the spatial diversity of rays, and is equally fundamental.

F. Illustrative Application to the Flyby Anomaly

FIG. 11 reproduces the graph of the SSN range residuals against DSN data in the 1998 NEAR flyby from Antreasian and Guinn's paper, of values as large as 1 km, inconsistent with their independently established resolutions. Current focus on the 760 mHz mismatch between pre- and post-encounter DSN data as velocity gain admits exotic explanations like dark matter [S L Adler, arXiv:1112.5426, 2011], even though the anomalies are within the range of satellite orbits that show no such issues.

The difference in the residuals of the two SSN stations cannot have come from the SSN, whose data represents true two-way round trip times. Antreasian and Guinn state that the residuals were computed by "passing the (SSN) data through a trajectory estimated with pre-encounter DSN data", so each station's data was checked separately. The range errors precluded further check of the differenced SSN range data against the DSN Doppler data. The output of the DSN carrier loop would be a chirp during the pre-encounter acceleration, implying a chirp form of eq. (9), $$\int_T \exp(-\omega_0 \beta^{-1} e^{\beta[t-r/c]}) e^{i\omega_r t} dt \approx \delta(\omega_0 e^{-\beta r/c} - \omega_r), \quad (39)$$

where the integral would again vanish unless the reference angular frequency $\omega_r$ varies the same way during integration as the arriving chirp, as in eq. (35). The DSN reference is the uplink transmitter signal, synchronized with atomic reference clocks [§ III-A, Anderson, Laing et al.], and translated to the downlink frequency, so the integral is only satisfied by chirp spectral components of this uplink reference signal. The lag is still contained in the downlink signal, and yields both the Doppler error $\Delta\upsilon = a\Delta t$ and a range error $\Delta r = \upsilon \Delta t$ accounting for the SSN residuals, as explained.

FIG. 12a illustrates this error between the true velocity profile in approach (171), which would have otherwise matched the differenced SSN range data, and the Doppler signal (172) expected for the DSN cycle counts over the duration of the flyby. The error is equivalent to an unexpected delay of $\Delta t$, and the Doppler information of closest approach (174) thus lags the true periapsis (173). The curves are monotonic, but cannot coincide over the SSN tracking period, indicated on the time axis (14), under vertical displacements, because of curvature due to acceleration. This explains the irreducibility of these residuals through $\Delta\upsilon$ estimation noted by Antreasian and Guinn.

The anomaly, as currently defined, refers to inconsistency of the post-encounter segment of the DSN Doppler profile (172) captured at Canberra to the right of AOS (acquisition of signal) in the figure, with trajectory estimated from the pre-encounter segment of the same profile (172) obtained at Goldstone prior to LOS (loss of signal). As more clearly depicted in FIG. 12b, the pre-encounter based estimated trajectory (175) could pass through the true periapsis (173) and closely follow the pre-encounter segment of the DSN Doppler signal profile (172) after LOS, but it would then exhibit a larger velocity deviation $\Delta\upsilon$ from the DSN Doppler signal profile (172) near periapsis, as shown by its dotted extension right of the true periapsis (173), because the estimation adjusts the velocity down to fit the DSN Doppler signal profile (172) at LOS. The estimation error $\Delta\upsilon$ depends on when the DSN Doppler signal is measured. Antreasian and Guinn reported the anomaly as reducible by estimation since a reestimated post-encounter trajectory (176), adjusted for the velocity difference $\Delta\upsilon$ at AOS, fits the post-AOS segment of the profile (172) to within expected margins of error.

The apparent velocity gain $\Delta\upsilon$ is therefore positive if the DSN Doppler profile (172) is observed before the peak of the true velocity profile (171) left of true periapsis (173) in FIG. 12a, or after the DSN Doppler's post-encounter negative peak right of its apparent periapsis (174). The negative $\Delta\upsilon$ in the Galileo's second flyby corresponds to observations through or very close to the periapsis since atmospheric drag was considered a significant contributor. The delayed DSN Doppler signal profile (172) would have implied the spacecraft was slow reaching periapsis, where the signal changes sign. In the Cassini flyby, for which a negative anomalous $\Delta\upsilon$ is also reported despite masking by the firing of attitude control jets, the tracking was continuous through the true periapsis (173).

The quantitative explanation of the SSN residuals in the Background was arrived at as follows. As the net speed change was merely (6.87-6.83)/6.87≈0.6%, and most acceleration was close to earth in increasingly tangential motion, the hyperbolic excess speed at periapsis $V_\infty \equiv 6.851$ km s$^{-1}$, which is also the mean of its asymptotic values, should be close enough for the present estimates.

This notion is supported by the uniformity of the 10 min ticks in the equatorial view, given as FIG. 1 by Anderson, Campbell et al. The large difference in the latter before and after the flyby in similar 10 min ticks in the north polar view (FIG. 9 in Antreasian and Guinn) is partly due to the projection. The polar and equatorial views more particularly show the motion was mostly radial. The 219 min gap in DSN tracking thus signifies 6.851 km s$^{-1}$×219 min=90, 000 km.

According to Antreasian and Guinn, the SSN tracking ended at 06:51:08 at Altair 32 min before periapsis, i.e., at about 6.851 km s$^{-1}$×32 min≈ 13,150 km, signifying a one-way delay of 43.9 ms and range error of 300 m, neglecting errors due to the earth's radius and the inclination of spacecraft motion to the radial, which would both require more detailed trajectory information. The tracking started at 06:14:28 at Altair and 06:12:22 at Millstone, representing ranges of 28, 230 km~ 94.2 ms and 29, 090 km~ 97 ms, hence range errors 645 m and 665 m, respectively. The actual residuals are closer to 950 m, about 30% larger. Corrections for the earth's radius and the tangential component of the velocity vector would both reduce the range error estimates, so the larger residuals point to an underestimation of range in these calculations using $V_\infty$. The peak velocity $V_f$=12.739 km s$^{-1}$, at periapsis indeed leads to 26% and 30% overestimations for Altair and Millstone, respectively.

The rate of decrease due to diminishing range would have been 6.851 km s$^{-1}$×6.851 km s$^{-1}$/c≈0.157 m s$^{-1}$, across 1187 s from 06:25:25 to 06:45:12, implying 0.157×1187≈186 m. This matches the 200 m decrease in the Millstone residual in this period quite closely, as shown. The differences between the residuals in slope and magnitude in FIG. 11 follow the radial ranges and accelerations discernible in the equatorial and polar views and the ground track diagram (FIG. 7 in Antreasian and Guinn's paper). The trajectory is almost equidistant from the two SSN stations in the ground track diagram, initially moving away from Altair towards Millstone, so the delay $\Delta t$ for Millstone initially decreased faster. The subsequent southward turn indicates a sustained greater acceleration towards Altair. The Millstone residuals indeed start out larger and cluster around Altair's, and are subsequently smaller, decreasing slower than Altair's, consistent with the turn.

The explanations given in the Background for the anomalies in the DSN data are based on the Canberra AOS range estimate of 62, 070 km from the stated AOS time of 2 h 31 min after periapsis, implying 207 ms excess one-way delay, which should cause 21.4 mm s$^{-1}$ actual velocity error, that would be interpreted as 11.7 mm s$^{-1}$ from the two-day data, as stated.

For the post-encounter diurnal oscillations, Canberra's latitude of 35.2828° places it 6371 km×cos(35.2828°)=5201 km off the earth's axis. The declination, i.e., the angle from the equatorial plane, for the outgoing asymptotic velocity was −71.96°, according to Anderson, Campbell et al, so the diurnal range variation would have been 5201 km×cos (71.96°)≈1611 km along the asymptote, which would imply a 15.6 mHz oscillation in the post-encounter Doppler. Anderson, Campbell et al. attributed the entire oscillation to inadequacy of the pre-encounter trajectory for predicting the post-encounter direction. The excess one-way delay of 94 ms at Goldstone LOS would cause such an issue, but a part of the difference would be due to a slightly smaller declination at AOS.

Every detail of the flyby anomaly is thus well explained by the Doppler lag, which belongs to the Doppler signal and is independent of the inventive chirp travelling wave components. The lag was observable only by decomposition of the uplink reference signal into a chirp spectrum (eq. 39), however, and the DSN range data showed the same anomaly only by demodulation from the chirp spectrum. The anomaly proves the reality of such lags and the realizability of chirp spectra. Further support lies in the broader consistency of astrophysical and geophysical data with the Hubble shifts themselves being lags due to a residual systematic, as explained in the Background.

G. Variations

Numerous variations of the present invention, by itself and in combination with other technologies, are envisaged and intended within its scope. For example, since the frequency lags in the inventive chirp components are primarily due to travel time and not the distance, ultra-slow light techniques ["Light speed reduction to 17 metres per second . . . ", L V Hau, S E Harris, Z Dutton and C H Behroozi, *Nature,* 1999] could be exploited to achieve large shifts in very short scale applications.

Likewise, commercial tunable lasers are mechanically tuned external cavity devices intended for spectroscopy, and as shown in the SPIE paper, mechanical tuning is too slow for the fractional rates required in terrestrial applications. A vertical cavity surface emitting laser (VCSEL) described by C Gierl et al. ["Surface micromachined tunable 1.55 μm-VCSEL with 102 nm continuous single-mode tuning", Optics Exp, 19(18), pp. 17336-17343 (2011)] achieves linear tuning at to 215 Hz, and could be used for coherent selection of the chirp spectral components in optical fibres.

In addition, distance information at short range yielded by the frequency lags, as in a studio or a theatre, may be captured and encoded alongside conventional modulation, for subsequent analysis or reconstruction of the spatial source distribution, thereby generalizing over the "scatter plot" of sources described in the Multiplexing Patent. Reverse exploitation of the lags, by measuring shifts in frequency or wavelength of known sources at known distances to calibrate the realized fractional rate of a receiver, is also envisaged, generalizing over reverse use of the Hubble shifts for estimating residual drifts in existing instruments, as proposed in the first Phase Gradient Patent.

Use of the inventive lags in the plane of polarization might seem redundant for some applications like receiving a signal through a polarization constraining channel, or for imaging at a different angle of polarization, in analogy to FIG. 10b, or for capacity multiplication, discussed in FIG. 10a, due to the nature of polarization. However, the lags in polarization could be exploited by themselves, with the mentioned advantage that the implementation of spectral decomposition or selection, including demodulation, could be kept unchanged, for source ranging and for separation or discrimination of signals by source range, just as described for the chirp frequency lags in Section D. The polarization lags may be also combined with the chirp frequency lags in all applications.

Lastly, the lags and distance information in polarization, frequency or wavelength would be also independent of the angular momentum of the received photons, so all of the properties, advantages and applications described for the inventive travelling wave spectral components remain applicable in combination with angular momentum multiplexing.

Many other modifications and variations may be devised given the above description of various embodiments for implementing the principles in the present disclosure. It is intended that all such modifications and variations be considered within the spirit and scope of this disclosure as defined in the following claims.

I claim:

1. A receiver for obtaining a signal from electromagnetic, acoustic or other waves, the electromagnetic, acoustic or other waves arriving at the receiver from one or more sources of said waves, and the one or more sources being located at various distances from the receiver, wherein the receiver performs spectral decomposition or selection involving one or more reference quantities to construct spectral components having monotonic variation with time at the receiver in one or more time varying properties other than phase or amplitude, and the receiver varies the one or more reference quantities over time so as to induce the monotonic variation with time at a first set of rates of variation in the one or more time varying properties other than phase or amplitude, and the receiver obtains the signal from the constructed spectral components.

2. The receiver of claim 1, wherein instantaneous values of the one or more time varying properties at the receiver lag behind their values at the one or more sources in proportion to the first set of rates of variation in the one or more time varying properties and the distance of each source from the receiver.

3. The receiver of claim 2, wherein the receiver reconstructs time domain waveforms from the signal obtained from the constructed spectral components.

4. The receiver of claim 1, wherein the one or more time varying properties vary linearly.

5. The receiver of claim 1, wherein the one or more time varying properties vary exponentially.

6. The receiver of claim 1, wherein the waves are transverse, the one or more time varying properties include a plane of polarization, and a time variation in the plane of polarization is slow enough to be in effect monotonic over the various distances of the one or more sources from the receiver.

7. The receiver of claim 1, wherein the one or more time varying properties comprise frequency, wavelength or time scale, or a function thereof.

8. The receiver of claim 1, wherein the spectral components correlate at the receiver with other such spectral components having a second set of rates of variation of the one or more time varying properties.

9. The receiver of claim 7, wherein the spectral components are observable only at a first set of wavelengths in proximity to the one or more sources, are transmitted through or scattered by a physical medium, channel, object or scene en route from the one or more sources to the receiver, the physical medium, the channel, the object or the scene en route transmitting or scattering only a second set of wavelengths differing from the first set of wavelengths, wherein the spectral components travel to the receiver at the second set of wavelengths.

10. The receiver of claim 9, wherein the physical medium, the channel, the object or the scene en route bear transmission or scattering characteristics of interest at the second set of wavelengths and the spectral components arrive at the receiver bearing information of the transmission or scattering characteristics of interest at the second set of wavelengths.

11. The receiver of claim 1, wherein the spectral components are obtained using diffraction, refraction or a combination of diffraction and refraction.

12. The receiver of claim 1, wherein the spectral components are obtained using a digital transform.

13. The receiver of claim 12, wherein the spectral components are obtained using autocorrelation prior to the digital transform.

14. The receiver of claim 1, wherein the waves bear information modulated or encoded on one or more carrier frequencies.

15. A method for obtaining spectral components of electromagnetic, acoustic or other waves travelling at finite speeds from one or more sources of said waves to a receiver, the spectral components bearing one or more time varying properties, other than phase or amplitude, that vary monotonically with time at the receiver at a first set of rates of variation, the method comprising the step of: performing at the receiver spectral decomposition or selection involving one or more reference quantities.

16. The method of claim 15, wherein the step of spectral decomposition or selection comprises varying said one or more reference quantities with time.

17. The method of claim 16, wherein the waves bear information modulated or encoded on one or more carrier frequencies, the receiver includes one or more reference signals, the one or more reference quantities comprise frequencies of the one or more reference signals, and the method further comprises the step of: demodulating said modulated or encoded information using the one or more reference signals.

18. The method of claim 17, wherein the step of demodulating said modulated or encoded information using the one or more reference signals comprises "mixing" or down-translation.

19. The method of claim 17, wherein the method further comprises the steps of: locking a frequency or phase lock loop at the receiver to a locked one of said carrier frequencies to provide a provided one of said reference signals, and varying the frequency of the provided one of said reference signals from the locked one of said carrier frequencies.

20. The method of claim 19, wherein the varying the frequency step is performed using a control signal.

* * * * *